(12) United States Patent
Luo et al.

(10) Patent No.: US 12,289,729 B2
(45) Date of Patent: Apr. 29, 2025

(54) CONDITIONAL GRANT THAT OVERRIDES ANOTHER GRANT

(71) Applicant: QUALCOMM Incorporated, San Diego, CA (US)

(72) Inventors: Jianghong Luo, Skillman, NJ (US); Navid Abedini, Basking Ridge, NJ (US); Jing Sun, San Diego, CA (US); Xiaoxia Zhang, San Diego, CA (US); Junyi Li, Franklin Park, NJ (US); Tao Luo, San Diego, CA (US); Naeem Akl, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 674 days.

(21) Appl. No.: 17/319,919

(22) Filed: May 13, 2021

(65) Prior Publication Data
US 2022/0369357 A1 Nov. 17, 2022

(51) Int. Cl.
| | |
|---|---|
| *H04W 72/23* | (2023.01) |
| *H04W 24/08* | (2009.01) |
| *H04W 72/1268* | (2023.01) |
| *H04W 72/21* | (2023.01) |
| *H04W 74/0816* | (2024.01) |

(52) U.S. Cl.
CPC ........... *H04W 72/23* (2023.01); *H04W 24/08* (2013.01); *H04W 72/1268* (2013.01); *H04W 72/21* (2023.01); *H04W 74/0816* (2013.01)

(58) Field of Classification Search
CPC . H04W 72/23; H04W 72/21; H04W 72/1268; H04W 24/08; H04W 74/0816

USPC ......................................................... 370/329
See application file for complete search history.

(56) References Cited

U.S. PATENT DOCUMENTS

| | | | |
|---|---|---|---|
| 2013/0051341 A1* | 2/2013 | Suzuki ................... | H04L 1/1835 370/329 |
| 2016/0255608 A1* | 9/2016 | Park ....................... | H04L 5/0087 370/280 |
| 2019/0268933 A1 | 8/2019 | Sun et al. | |
| 2021/0045093 A1 | 2/2021 | Rao et al. | |
| 2022/0007385 A1* | 1/2022 | Dudda ................. | H04W 72/569 |

OTHER PUBLICATIONS

International Search Report and Written Opinion—PCT/US2022/071751—ISA/EPO—Jun. 27, 2022.

(Continued)

*Primary Examiner* — Chi Tang P Cheng
(74) *Attorney, Agent, or Firm* — MG-IP Law, P.C.

(57) ABSTRACT

Disclosed are techniques for wireless communication. In an aspect, a wireless node (e.g., gNB or UE) transmits, to a UE, a grant of a set of resources for a first communication between the UE and the wireless node. The wireless node further transmits, to the UE, a conditional grant associated with a set of conditional parameters for a second communication that overrides the grant for some or all of a subset of the set of resources. The UE and/or the wireless node detects a triggering event or an indication of the triggering event for triggering the conditional grant with at least one conditional parameter of the set of conditional parameters. The UE and the wireless node perform the second communication in accordance with the at least one conditional parameter on some or all of the subset of resources based on the detection.

14 Claims, 18 Drawing Sheets

(56) References Cited

OTHER PUBLICATIONS

Lenovo., et al., "Enhancements for URLLC in Unlicensed Controlled Environments", 3GPP TSG-RAN WG2 Meeting #113 electronic, R2-2100921, 3rd Generation Partnership Project, Mobile Competence Centre, 650, Route Des Lucioles, F-06921 Sophia-Antipolis Cedex, France, vol. Ran WG2, No. Electronic, Jan. 25, 2021-Feb. 5, 2021, Jan. 14, 2021, pp. 1-9, XP051972753.
Mediatek Inc: "Methods for Intra-UE Multiplexing and Prioritization", 3GPP TSG RAN WG1 Meeting #105-e, R1-2105735, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, 7 Pages, XP052011678.

* cited by examiner

CONDITIONAL GRANT THAT OVERRIDES ANOTHER GRANT

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a user equipment (UE) includes receiving, from a wireless node, a grant of a set of resources for a first communication between the UE and the wireless node; receiving, from the wireless node, a first conditional grant associated with a set of conditional parameters for a second communication that overrides the grant for some or all of a subset of the set of resources; detecting a first triggering event or an indication of the first triggering event for triggering the first conditional grant with at least one conditional parameter of the set of conditional parameters; and performing the second communication in accordance with the at least one conditional parameter on some or all of the subset of resources based on the detection.

In some aspects, the method includes canceling, in response to the detection, the first communication on some or all of the subset of resources.

In some aspects, the first triggering event is based on one or more parameters with values that are not known when the first conditional grant is received.

In some aspects, the set of conditional parameters is unspecified in the first conditional grant, or the set of conditional parameters comprises a list of candidate values for the set of conditional parameters in the first conditional grant, or wherein the set of conditional parameters comprises a range of candidate values for the set of conditional parameters in the first conditional grant, or a combination thereof.

In some aspects, the first triggering event is indicated by the first conditional grant, or pre-configured by a higher-layer messaging, or pre-defined.

In some aspects, the set of resources is associated with consecutive uplink transmissions in New Radio Unlicensed (NRU) spectrum.

In some aspects, the first triggering event comprises cancellation of the first communication on the subset of resources.

In some aspects, the first communication comprises multiple transmissions of a scheduled or configured physical uplink shared channel (PUSCH), wherein the first triggering event comprises a demodulation reference signal (DMRS) that indicates the cancellation of the scheduled or configured PUSCH on the subset of resources due to listen before talk (LBT) failure, and wherein the second communication comprises physical downlink shared channel (PDSCH).

In some aspects, the first communication comprises multiple transmissions of a scheduled or configured physical uplink shared channel (PUSCH), and the consecutive uplink transmissions are each associated with a different transport block (TB).

In some aspects, the first communication comprises multiple repetitions of a scheduled or configured physical uplink shared channel (PUSCH) or physical uplink control channel (PUCCH), and the consecutive uplink transmissions are repetitions of the same transport block (TB).

In some aspects, the first triggering event comprises an initial contention-based transmission of the first communication subject to listen before talk (LBT), and a starting time for the second communication is offset from the initial contention-based transmission.

In some aspects, the first communication comprises multiple repetitions of a physical downlink shared channel (PDSCH).

In some aspects, the first triggering event includes successful decoding of the PDSCH at the UE, and the subset of resources for the second communication comprise a plurality of physical uplink control channel (PUCCH) candidate resources.

In some aspects, the UE begins transmission of the second communication comprising PUCCH feedback on an earliest candidate resource following the successful decoding of the PDSCH, or the UE begins communication of the second communication comprising a next downlink or uplink communication on a respective candidate resource based on a time offset following the successful decoding of the PDSCH.

In some aspects, the UE begins transmission of the second communication comprising PUCCH feedback on an earliest candidate resource following the successful decoding of the PDSCH, and the UE, based on a second conditional grant for a third communication, begins communication of the third communication comprising a next downlink or uplink communication on a resource based on a time offset following the successful decoding of the PDSCH.

In some aspects, the first communication comprises multiple repetitions of a physical uplink shared channel (PUSCH).

In some aspects, the first triggering event includes successful decoding of the PUSCH at the wireless node, and the subset of resources for the second communication comprise a plurality of physical downlink control channel (PDCCH) candidate resources.

In some aspects, the UE monitors for the second communication comprising PDCCH on the plurality of PDCCH candidate resources.

In some aspects, the UE, based on a second conditional grant for a third communication, begins communication of the third communication comprising a next downlink or uplink communication on a resource based on a time offset following receipt of the PDCCH.

In some aspects, the first communication corresponds to a downlink communication, an uplink communication, a sidelink communication, or a fronthaul communication.

In some aspects, the second communication corresponds to a downlink communication, an uplink communication, a sidelink communication, or a fronthaul communication.

In some aspects, the first conditional grant follows the grant.

In some aspects, the grant follows the first conditional grant.

In an aspect, a method of operating a wireless node includes transmitting, to a user equipment (UE), a grant of a set of resources for a first communication between the UE and the wireless node; transmitting, to the UE, a first conditional grant associated with a set of conditional parameters for a second communication that overrides the grant for some or all of a subset of the set of resources; detecting a first triggering event or an indication of the first triggering event for triggering the first conditional grant with at least one conditional parameter of the set of conditional parameters; and performing the second communication in accordance with the at least one conditional parameter on some or all of the subset of resources based on the detection.

In some aspects, the first triggering event is based on one or more parameters with values that are not known when the first conditional grant is received.

In some aspects, the set of conditional parameters is unspecified in the first conditional grant, or the set of conditional parameters comprises a list of candidate values for the set of conditional parameters in the first conditional grant, or wherein the set of conditional parameters comprises a range of candidate values for the set of conditional parameters in the first conditional grant, or a combination thereof.

In some aspects, the set of resources is associated with consecutive uplink transmissions in New Radio Unlicensed (NRU) spectrum.

In some aspects, the first communication comprises multiple repetitions of a physical downlink shared channel (PDSCH) or a physical uplink shared channel (PUSCH).

In an aspect, a user equipment (UE) includes a memory; at least one transceiver; and at least one processor communicatively coupled to the memory and the at least one transceiver, the at least one processor configured to: receive, via the at least one transceiver, from a wireless node, a grant of a set of resources for a first communication between the UE and the wireless node; receive, via the at least one transceiver, from the wireless node, a first conditional grant associated with a set of conditional parameters for a second communication that overrides the grant for some or all of a subset of the set of resources; detect a first triggering event or an indication of the first triggering event for triggering the first conditional grant with at least one conditional parameter of the set of conditional parameters; and perform the second communication in accordance with the at least one conditional parameter on some or all of the subset of resources based on the detection.

In some aspects, the at least one processor is further configured to: cancel, in response to the detection, the first communication on some or all of the subset of resources.

In some aspects, the first triggering event is based on one or more parameters with values that are not known when the first conditional grant is received.

In some aspects, the set of conditional parameters is unspecified in the first conditional grant, or the set of conditional parameters comprises a list of candidate values for the set of conditional parameters in the first conditional grant, or wherein the set of conditional parameters comprises a range of candidate values for the set of conditional parameters in the first conditional grant, or a combination thereof.

In some aspects, the first triggering event is indicated by the first conditional grant, or pre-configured by a higher-layer messaging, or pre-defined.

In some aspects, the set of resources is associated with consecutive uplink transmissions in New Radio Unlicensed (NRU) spectrum.

In some aspects, the first triggering event comprises cancellation of the first communication on the subset of resources.

In some aspects, the at least one processor is further configured to: wherein the first communication comprises multiple transmissions of a scheduled or configured physical uplink shared channel (PUSCH), wherein the first triggering event comprises a demodulation reference signal (DMRS) that indicates the cancellation of the scheduled or configured PUSCH on the subset of resources due to listen before talk (LBT) failure, and wherein the second communication comprises physical downlink shared channel (PDSCH).

In some aspects, the first communication comprises multiple transmissions of a scheduled or configured physical uplink shared channel (PUSCH), and the consecutive uplink transmissions are each associated with a different transport block (TB).

In some aspects, the first communication comprises multiple repetitions of a scheduled or configured physical uplink shared channel (PUSCH) or physical uplink control channel (PUCCH), and the consecutive uplink transmissions are repetitions of the same transport block (TB).

In some aspects, the first triggering event comprises an initial contention-based transmission of the first communication subject to listen before talk (LBT), and a starting time for the second communication is offset from the initial contention-based transmission.

In some aspects, the first communication comprises multiple repetitions of a physical downlink shared channel (PDSCH).

In some aspects, the first triggering event includes successful decoding of the PDSCH at the UE, and the subset of resources for the second communication comprise a plurality of physical uplink control channel (PUCCH) candidate resources.

In some aspects, the UE begins transmission of the second communication comprising PUCCH feedback on an earliest candidate resource following the successful decoding of the PDSCH, or the UE begins communication of the second communication comprising a next downlink or uplink communication on a respective candidate resource based on a time offset following the successful decoding of the PDSCH.

In some aspects, the UE begins transmission of the second communication comprising PUCCH feedback on an earliest candidate resource following the successful decoding of the PDSCH, and the UE, based on a second conditional grant for a third communication, begins communication of the third communication comprising a next downlink or uplink communication on a resource based on a time offset following the successful decoding of the PDSCH.

In some aspects, the first communication comprises multiple repetitions of a physical uplink shared channel (PUSCH).

In some aspects, the first triggering event includes successful decoding of the PUSCH at the wireless node, and the subset of resources for the second communication comprise a plurality of physical downlink control channel (PDCCH) candidate resources.

In some aspects, the UE monitors for the second communication comprising PDCCH on the plurality of PDCCH candidate resources.

In some aspects, the UE, based on a second conditional grant for a third communication, begins communication of the third communication comprising a next downlink or uplink communication on a resource based on a time offset following receipt of the PDCCH.

In some aspects, the first communication corresponds to a downlink communication, an uplink communication, a sidelink communication, or a fronthaul communication.

In some aspects, the second communication corresponds to a downlink communication, an uplink communication, a sidelink communication, or a fronthaul communication.

In some aspects, the first conditional grant follows the grant.

In some aspects, the grant follows the first conditional grant.

In an aspect, a wireless node includes a memory; at least one transceiver; and at least one processor communicatively coupled to the memory and the at least one transceiver, the at least one processor configured to: transmit, via the at least one transceiver, to a user equipment (UE), a grant of a set of resources for a first communication between the UE and the wireless node; transmit, via the at least one transceiver, to the UE, a first conditional grant associated with a set of conditional parameters for a second communication that overrides the grant for some or all of a subset of the set of resources; detect a first triggering event or an indication of the first triggering event for triggering the first conditional grant with at least one conditional parameter of the set of conditional parameters; and perform the second communication in accordance with the at least one conditional parameter on some or all of the subset of resources based on the detection.

In some aspects, the first triggering event is based on one or more parameters with values that are not known when the first conditional grant is received.

In some aspects, the set of conditional parameters is unspecified in the first conditional grant, or the set of conditional parameters comprises a list of candidate values for the set of conditional parameters in the first conditional grant, or wherein the set of conditional parameters comprises a range of candidate values for the set of conditional parameters in the first conditional grant, or a combination thereof.

In some aspects, the set of resources is associated with consecutive uplink transmissions in New Radio Unlicensed (NRU) spectrum.

In some aspects, the first communication comprises multiple repetitions of a physical downlink shared channel (PDSCH) or a physical uplink shared channel (PUSCH).

In an aspect, a user equipment (UE) includes means for receiving, from a wireless node, a grant of a set of resources for a first communication between the UE and the wireless node; means for receiving, from the wireless node, a first conditional grant associated with a set of conditional parameters for a second communication that overrides the grant for some or all of a subset of the set of resources; means for detecting a first triggering event or an indication of the first triggering event for triggering the first conditional grant with at least one conditional parameter of the set of conditional parameters; and means for performing the second communication in accordance with the at least one conditional parameter on some or all of the subset of resources based on the detection.

In some aspects, the method includes means for canceling, in response to the detection, the first communication on some or all of the subset of resources.

In some aspects, the first triggering event is based on one or more parameters with values that are not known when the first conditional grant is received.

In some aspects, the set of conditional parameters is unspecified in the first conditional grant, or the set of conditional parameters comprises a list of candidate values for the set of conditional parameters in the first conditional grant, or wherein the set of conditional parameters comprises a range of candidate values for the set of conditional parameters in the first conditional grant, or a combination thereof.

In some aspects, the first triggering event is indicated by the first conditional grant, or pre-configured by a higher-layer messaging, or pre-defined.

In some aspects, the set of resources is associated with consecutive uplink transmissions in New Radio Unlicensed (NRU) spectrum.

In some aspects, the first triggering event comprises cancellation of the first communication on the subset of resources.

In some aspects, the first communication comprises multiple transmissions of a scheduled or configured physical uplink shared channel (PUSCH), wherein the first triggering event comprises a demodulation reference signal (DMRS) that indicates the cancellation of the scheduled or configured PUSCH on the subset of resources due to listen before talk (LBT) failure, and wherein the second communication comprises physical downlink shared channel (PDSCH).

In some aspects, the first communication comprises multiple transmissions of a scheduled or configured physical uplink shared channel (PUSCH), and the consecutive uplink transmissions are each associated with a different transport block (TB).

In some aspects, the first communication comprises multiple repetitions of a scheduled or configured physical uplink shared channel (PUSCH) or physical uplink control channel (PUCCH), and the consecutive uplink transmissions are repetitions of the same transport block (TB).

In some aspects, the first triggering event comprises an initial contention-based transmission of the first communication subject to listen before talk (LBT), and a starting time for the second communication is offset from the initial contention-based transmission.

In some aspects, the first communication comprises multiple repetitions of a physical downlink shared channel (PDSCH).

In some aspects, the first triggering event includes successful decoding of the PDSCH at the UE, and the subset of resources for the second communication comprise a plurality of physical uplink control channel (PUCCH) candidate resources.

In some aspects, the UE begins transmission of the second communication comprising PUCCH feedback on an earliest candidate resource following the successful decoding of the PDSCH, or the UE begins communication of the second communication comprising a next downlink or uplink communication on a respective candidate resource based on a time offset following the successful decoding of the PDSCH.

In some aspects, the UE begins transmission of the second communication comprising PUCCH feedback on an earliest candidate resource following the successful decoding of the PDSCH, and the UE, based on a second conditional grant for a third communication, begins communication of the third communication comprising a next downlink or uplink communication on a resource based on a time offset following the successful decoding of the PDSCH.

In some aspects, the first communication comprises multiple repetitions of a physical uplink shared channel (PUSCH).

In some aspects, the first triggering event includes successful decoding of the PUSCH at the wireless node, and the subset of resources for the second communication comprise a plurality of physical downlink control channel (PDCCH) candidate resources.

In some aspects, the UE monitors for the second communication comprising PDCCH on the plurality of PDCCH candidate resources.

In some aspects, the UE, based on a second conditional grant for a third communication, begins communication of the third communication comprising a next downlink or uplink communication on a resource based on a time offset following receipt of the PDCCH.

In some aspects, the first communication corresponds to a downlink communication, an uplink communication, a sidelink communication, or a fronthaul communication.

In some aspects, the second communication corresponds to a downlink communication, an uplink communication, a sidelink communication, or a fronthaul communication.

In some aspects, the first conditional grant follows the grant.

In some aspects, the grant follows the first conditional grant.

In an aspect, a wireless node includes means for transmitting, to a user equipment (UE), a grant of a set of resources for a first communication between the UE and the wireless node; means for transmitting, to the UE, a first conditional grant associated with a set of conditional parameters for a second communication that overrides the grant for some or all of a subset of the set of resources; means for detecting a first triggering event or an indication of the first triggering event for triggering the first conditional grant with at least one conditional parameter of the set of conditional parameters; and means for performing the second communication in accordance with the at least one conditional parameter on some or all of the subset of resources based on the detection.

In an aspect, the first triggering event is based on one or more parameters with values that are not known when the first conditional grant is received.

In an aspect, the set of conditional parameters is unspecified in the first conditional grant, or wherein the set of conditional parameters comprises a list of candidate values for the set of conditional parameters in the first conditional grant, or wherein the set of conditional parameters comprises a range of candidate values for the set of conditional parameters in the first conditional grant, or a combination thereof.

In an aspect, the set of resources is associated with consecutive uplink transmissions in New Radio Unlicensed (NRU) spectrum.

In an aspect, the first communication comprises multiple repetitions of a physical downlink shared channel (PDSCH) or a physical uplink shared channel (PUSCH).

In an aspect, a non-transitory computer-readable medium storing computer-executable instructions that, when executed by a user equipment (UE), cause the UE to: receive, from a wireless node, a grant of a set of resources for a first communication between the UE and the wireless node; receive, from the wireless node, a first conditional grant associated with a set of conditional parameters for a second communication that overrides the grant for some or all of a subset of the set of resources; detect a first triggering event or an indication of the first triggering event for triggering the first conditional grant with at least one conditional parameter of the set of conditional parameters; and perform the second communication in accordance with the at least one conditional parameter on some or all of the subset of resources based on the detection.

In some aspects, the one or more instructions further cause the UE to: cancel, in response to the detection, the first communication on some or all of the subset of resources.

In some aspects, the first triggering event is based on one or more parameters with values that are not known when the first conditional grant is received.

In some aspects, the set of conditional parameters is unspecified in the first conditional grant, or the set of conditional parameters comprises a list of candidate values for the set of conditional parameters in the first conditional grant, or wherein the set of conditional parameters comprises a range of candidate values for the set of conditional parameters in the first conditional grant, or a combination thereof.

In some aspects, the first triggering event is indicated by the first conditional grant, or pre-configured by a higher-layer messaging, or pre-defined.

In some aspects, the set of resources is associated with consecutive uplink transmissions in New Radio Unlicensed (NRU) spectrum.

In some aspects, the first triggering event comprises cancellation of the first communication on the subset of resources.

In some aspects, the one or more instructions further cause the UE to: wherein the first communication comprises multiple transmissions of a scheduled or configured physical uplink shared channel (PUSCH), wherein the first triggering event comprises a demodulation reference signal (DMRS) that indicates the cancellation of the scheduled or configured PUSCH on the subset of resources due to listen before talk (LBT) failure, and wherein the second communication comprises physical downlink shared channel (PDSCH).

In some aspects, the first communication comprises multiple transmissions of a scheduled or configured physical uplink shared channel (PUSCH), and the consecutive uplink transmissions are each associated with a different transport block (TB).

In some aspects, the first communication comprises multiple repetitions of a scheduled or configured physical uplink shared channel (PUSCH) or physical uplink control channel (PUCCH), and the consecutive uplink transmissions are repetitions of the same transport block (TB).

In some aspects, the first triggering event comprises an initial contention-based transmission of the first communication subject to listen before talk (LBT), and a starting time for the second communication is offset from the initial contention-based transmission.

In some aspects, the first communication comprises multiple repetitions of a physical downlink shared channel (PDSCH).

In some aspects, the first triggering event includes successful decoding of the PDSCH at the UE, and the subset of resources for the second communication comprise a plurality of physical uplink control channel (PUCCH) candidate resources.

In some aspects, the UE begins transmission of the second communication comprising PUCCH feedback on an earliest candidate resource following the successful decoding of the PDSCH, or the UE begins communication of the second communication comprising a next downlink or uplink communication on a respective candidate resource based on a time offset following the successful decoding of the PDSCH.

In some aspects, the UE begins transmission of the second communication comprising PUCCH feedback on an earliest candidate resource following the successful decoding of the PDSCH, and the UE, based on a second conditional grant for a third communication, begins communication of the third communication comprising a next downlink or uplink communication on a resource based on a time offset following the successful decoding of the PDSCH.

In some aspects, the first communication comprises multiple repetitions of a physical uplink shared channel (PUSCH).

In some aspects, the first triggering event includes successful decoding of the PUSCH at the wireless node, and the subset of resources for the second communication comprise a plurality of physical downlink control channel (PDCCH) candidate resources.

In some aspects, the UE monitors for the second communication comprising PDCCH on the plurality of PDCCH candidate resources.

In some aspects, the UE, based on a second conditional grant for a third communication, begins communication of the third communication comprising a next downlink or uplink communication on a resource based on a time offset following receipt of the PDCCH.

In some aspects, the first communication corresponds to a downlink communication, an uplink communication, a sidelink communication, or a fronthaul communication.

In some aspects, the second communication corresponds to a downlink communication, an uplink communication, a sidelink communication, or a fronthaul communication.

In some aspects, the first conditional grant follows the grant.

In some aspects, the grant follows the first conditional grant.

In an aspect, a non-transitory computer-readable medium storing computer-executable instructions that, when executed by a wireless node, cause the wireless node to: transmit, to a user equipment (UE), a grant of a set of resources for a first communication between the UE and the wireless node; transmit, to the UE, a first conditional grant associated with a set of conditional parameters for a second communication that overrides the grant for some or all of a subset of the set of resources; detect a first triggering event or an indication of the first triggering event for triggering the first conditional grant with at least one conditional parameter of the set of conditional parameters; and perform the second communication in accordance with the at least one conditional parameter on some or all of the subset of resources based on the detection.

In some aspects, the first triggering event is based on one or more parameters with values that are not known when the first conditional grant is received.

In some aspects, the set of conditional parameters is unspecified in the first conditional grant, or the set of conditional parameters comprises a list of candidate values for the set of conditional parameters in the first conditional grant, or wherein the set of conditional parameters comprises a range of candidate values for the set of conditional parameters in the first conditional grant, or a combination thereof.

In some aspects, the set of resources is associated with consecutive uplink transmissions in New Radio Unlicensed (NRU) spectrum.

In some aspects, the first communication comprises multiple repetitions of a physical downlink shared channel (PDSCH) or a physical uplink shared channel (PUSCH).

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
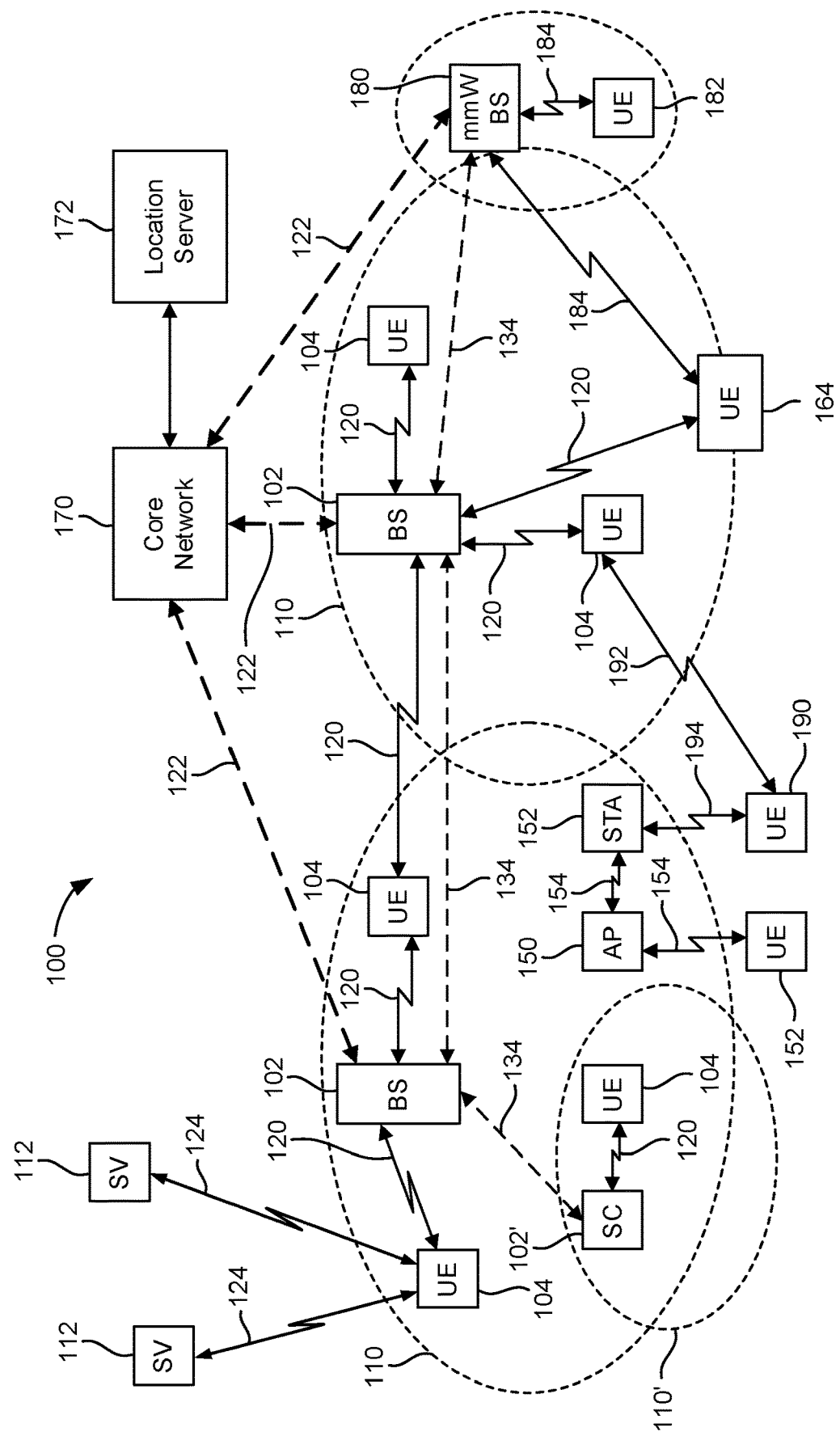
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile. 4 terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
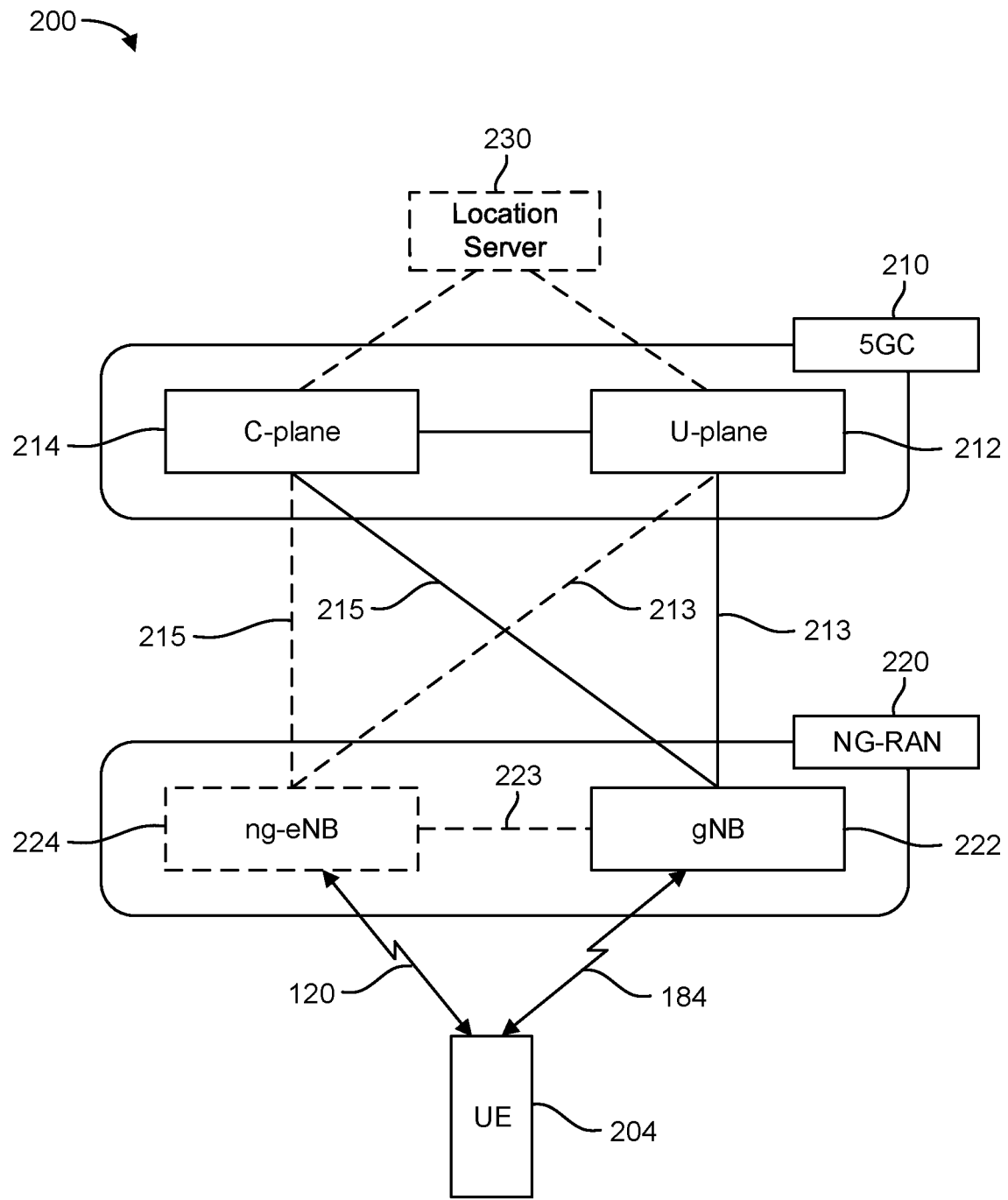
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
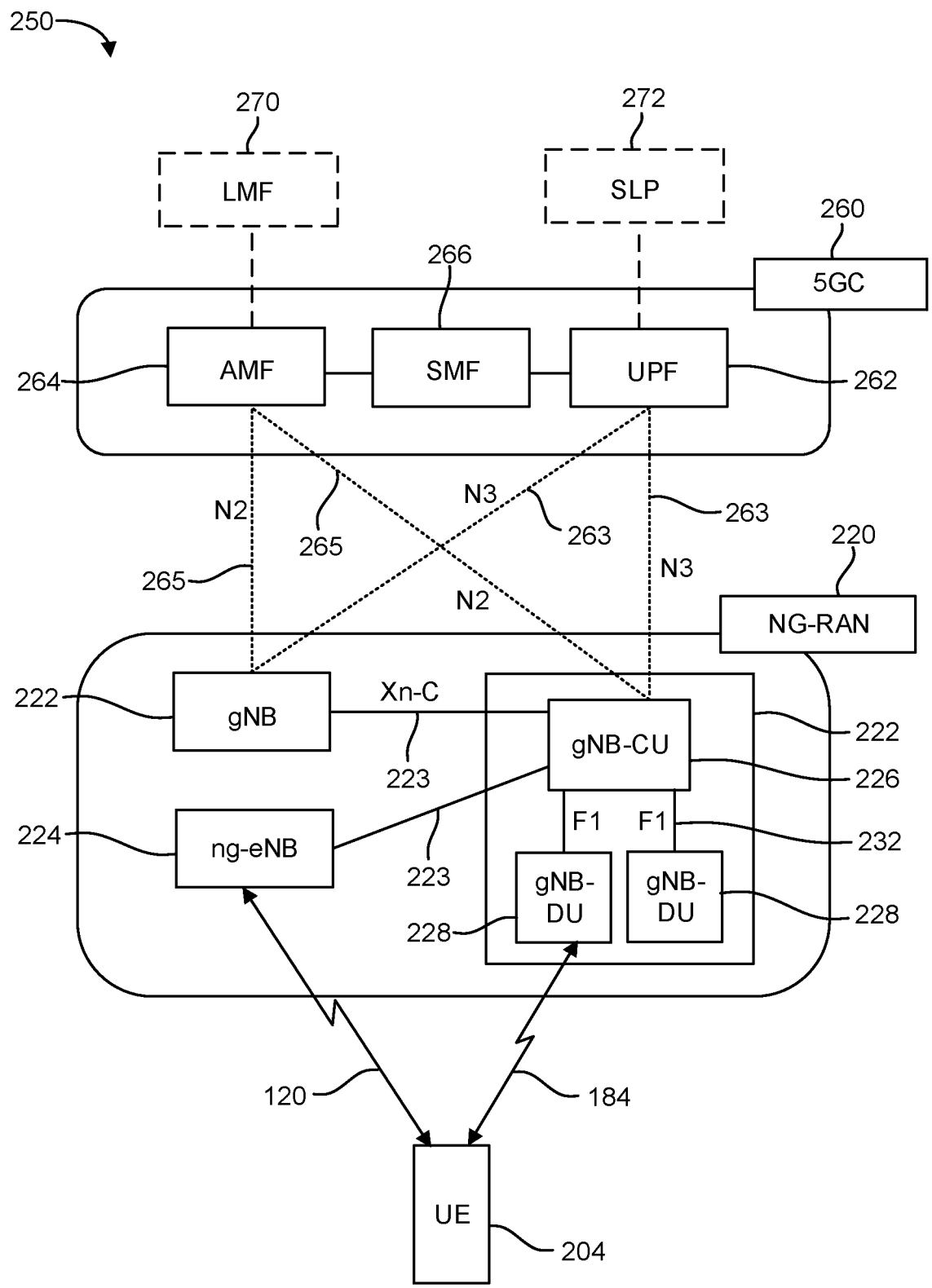

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
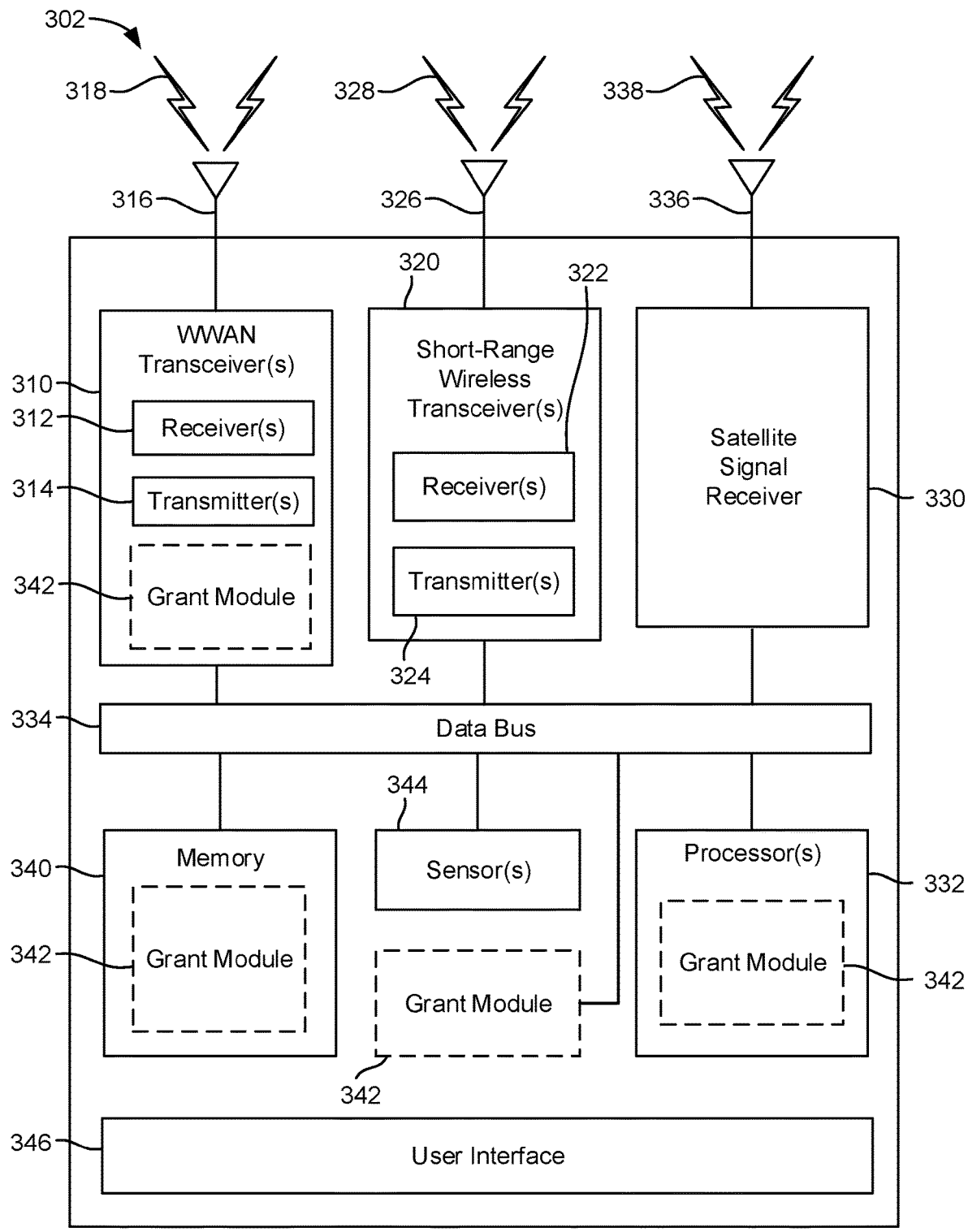
FIGS. 3A, 3B, and 3C are simplified block diagrams of several sample aspects of components that may be employed in a user equipment (UE), a base station, and a network entity, respectively, and configured to support communications as taught herein.
Figure 3B:
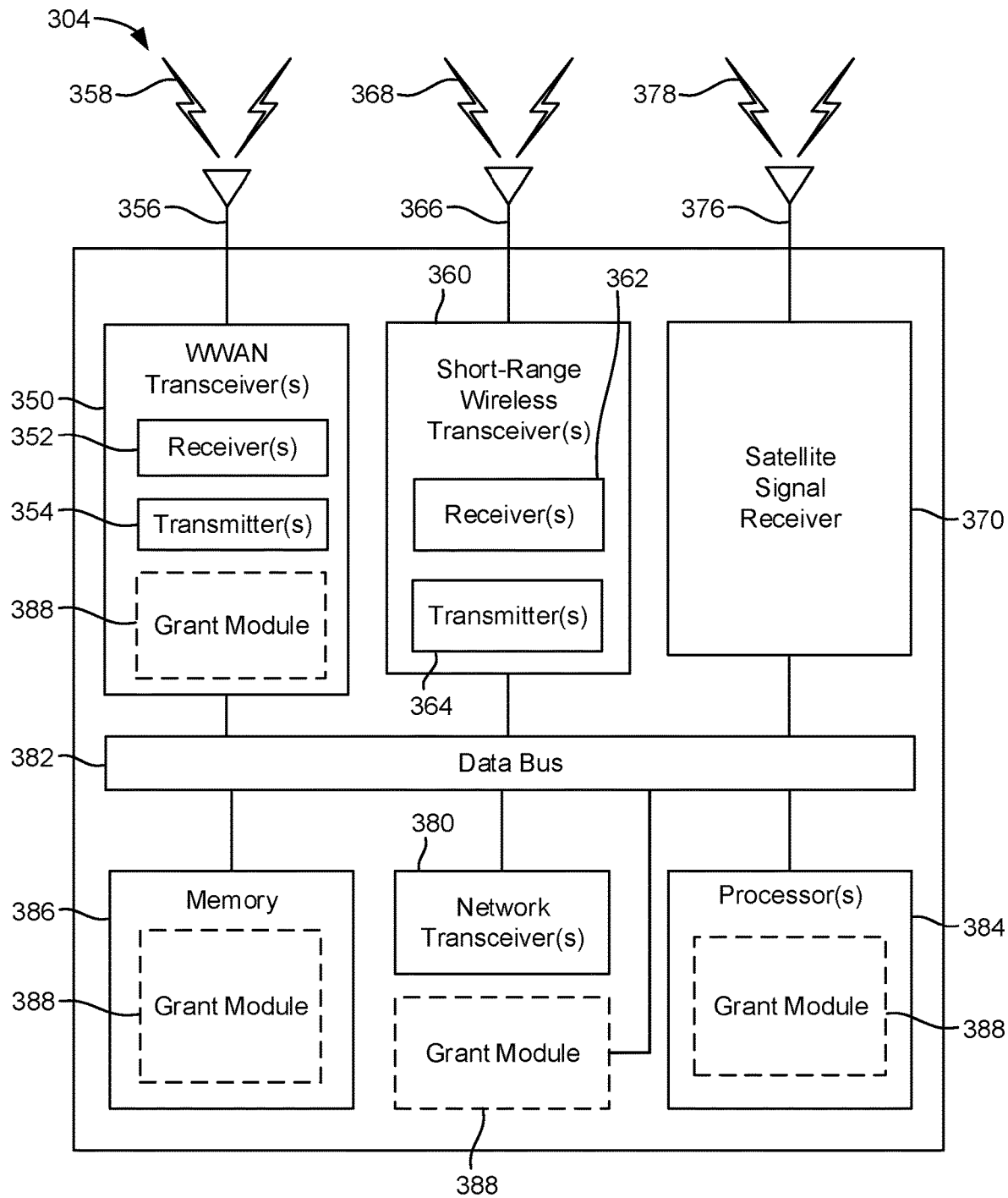
Figure 3C:
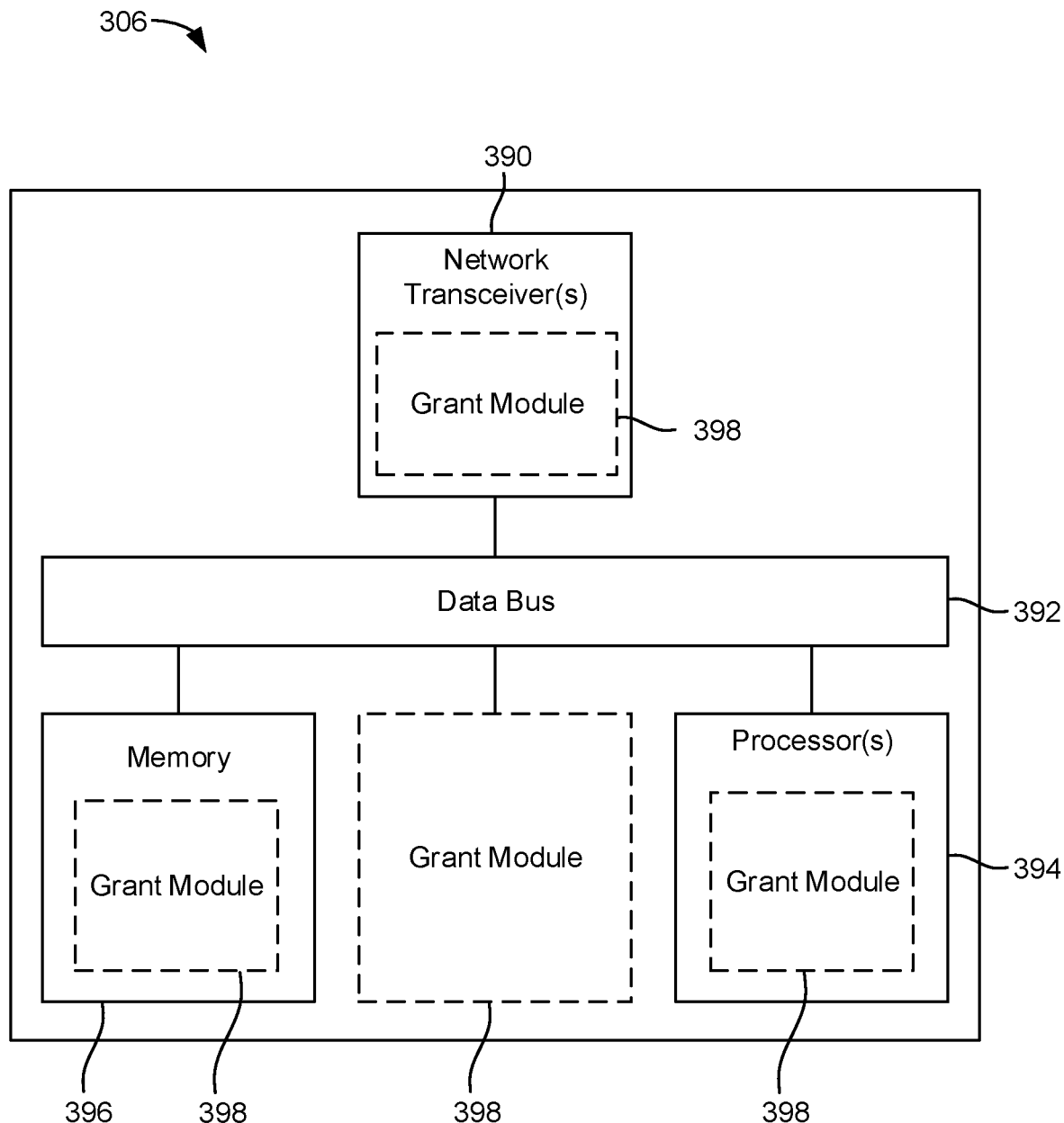

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include Grant Module 342, 388, and 398, respectively. The Grant Module 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the Grant Module 342, 388, and 398 may be external to the processors 332, 384, and 394 (e.g., part of a modem processing system, integrated with another processing system, etc.). Alternatively, the Grant Module 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the Grant Module 342, which may be, for example, part of the one or more WWAN transceivers 310, the memory 340, the one or more processors 332, or any combination thereof, or may be a standalone component. FIG. 3B illustrates possible locations of the Grant Module 388, which may be, for example, part of the one or more WWAN transceivers 350, the memory 386, the one or more processors 384, or any combination thereof, or may be a standalone component. FIG. 3C illustrates possible locations of the Grant Module 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the Grant Module 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

The following are the currently supported DCI formats. Format 0-0: fallback for scheduling of PUSCH; Format 0-1: non-fallback for scheduling of PUSCH; Format 1-0: fallback for scheduling of PDSCH; Format 1-1: non-fallback for scheduling of PDSCH; Format 2-0: notifying a group of UEs of the slot format; Format 2-1: notifying a group of UEs of the PRB(s) and OFDM symbol(s) where the UEs may assume no transmissions are intended for the UEs; Format 2-2: transmission of TPC commands for PUCCH and PUSCH; and Format 2-3: transmission of a group of SRS requests and TPC commands for SRS transmissions. Note that a fallback format is a default scheduling option that has non-configurable fields and supports basic NR operations. In contrast, a non-fallback format is flexible to accommodate NR features.

As will be appreciated, a UE needs to be able to demodulate (also referred to as "decode") the PDCCH in order to read the DCI, and thereby to obtain the scheduling of resources allocated to the UE on the PDSCH and PUSCH. If the UE fails to demodulate the PDCCH, then the UE will not know the locations of the PDSCH resources and it will keep attempting to demodulate the PDCCH using a different set of PDCCH candidates in subsequent PDCCH monitoring occasions. If the UE fails to demodulate the PDCCH after some number of attempts, the UE declares a radio link failure (RLF). To overcome PDCCH demodulation issues, search spaces are configured for efficient PDCCH detection and demodulation.

Generally, a UE does not attempt to demodulate each and very PDCCH candidate that may be scheduled in a slot. To reduce restrictions on the PDCCH scheduler, and at the same time to reduce the number of blind demodulation attempts by the UE, search spaces are configured. Search spaces are indicated by a set of contiguous CCEs that the UE is supposed to monitor for scheduling assignments/grants relating to a certain component carrier. There are two types of search spaces used for the PDCCH to control each component carrier, a common search space (CSS) and a UE-specific search space (USS).

A common search space is shared across all UEs, and a UE-specific search space is used per UE (i.e., a UE-specific search space is specific to a specific UE). For a common search space, a DCI cyclic redundancy check (CRC) is scrambled with a system information radio network temporary identifier (SI-RNTI), random access RNTI (RA-RNTI), temporary cell RNTI (TC-RNTI), paging RNTI (P-RNTI), interruption RNTI (INT-RNTI), slot format indication RNTI (SFI-RNTI), TPC-PUCCH-RNTI, TPC-PUSCH-RNTI, TPC-SRS-RNTI, cell RNTI (C-RNTI), or configured scheduling RNTI (CS-RNTI) for all common procedures. For a UE-specific search space, a DCI CRC is scrambled with a C-RNTI or CS-RNTI, as these are specifically targeted to individual UE.

A UE demodulates the PDCCH using the four UE-specific search space aggregation levels (1, 2, 4, and 8) and the two common search space aggregation levels (4 and 8). Specifically, for the UE-specific search spaces, aggregation level '1' has six PDCCH candidates per slot and a size of six CCEs. Aggregation level '2' has six PDCCH candidates per slot and a size of 12 CCEs. Aggregation level '4' has two PDCCH candidates per slot and a size of eight CCEs. Aggregation level '8' has two PDCCH candidates per slot and a size of 16 CCEs. For the common search spaces, aggregation level '4' has four PDCCH candidates per slot and a size of 16 CCEs. Aggregation level '8' has two PDCCH candidates per slot and a size of 16 CCEs. Each search space comprises a group of consecutive CCEs that could be allocated to a PDCCH, referred to as a PDCCH candidate. A UE demodulates all of the PDCCH candidates in these two search spaces (USS and CSS) to discover the DCI for that UE. For example, the UE may demodulate the DCI to obtain the scheduled uplink grant information on the PUSCH and the downlink resources on the PDSCH. Note that the aggregation level is the number of REs of a CORESET that carry a PDCCH DCI message, and is expressed in terms of CCEs. There is a one-to-one mapping between the aggregation level and the number of CCEs per aggregation level. That is, for aggregation level '4,' there are four CCEs. Thus, as shown above, if the aggregation level is '4' and the number of PDCCH candidates in a slot is '2,' then the size of the search space is '8' (i.e., 4×2=8).

Figure 4:
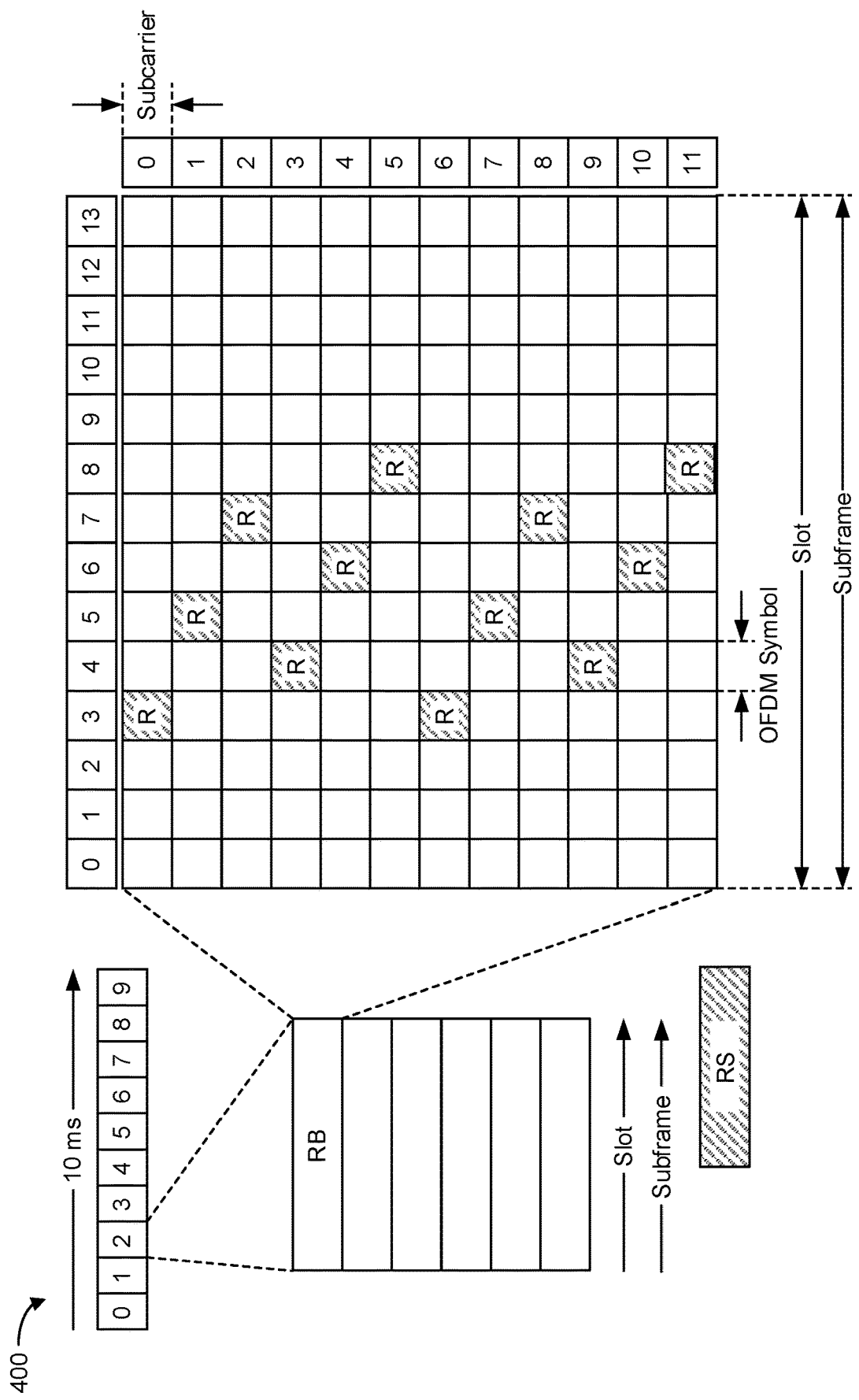
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying reference signals (labeled "R").

Figure 5:
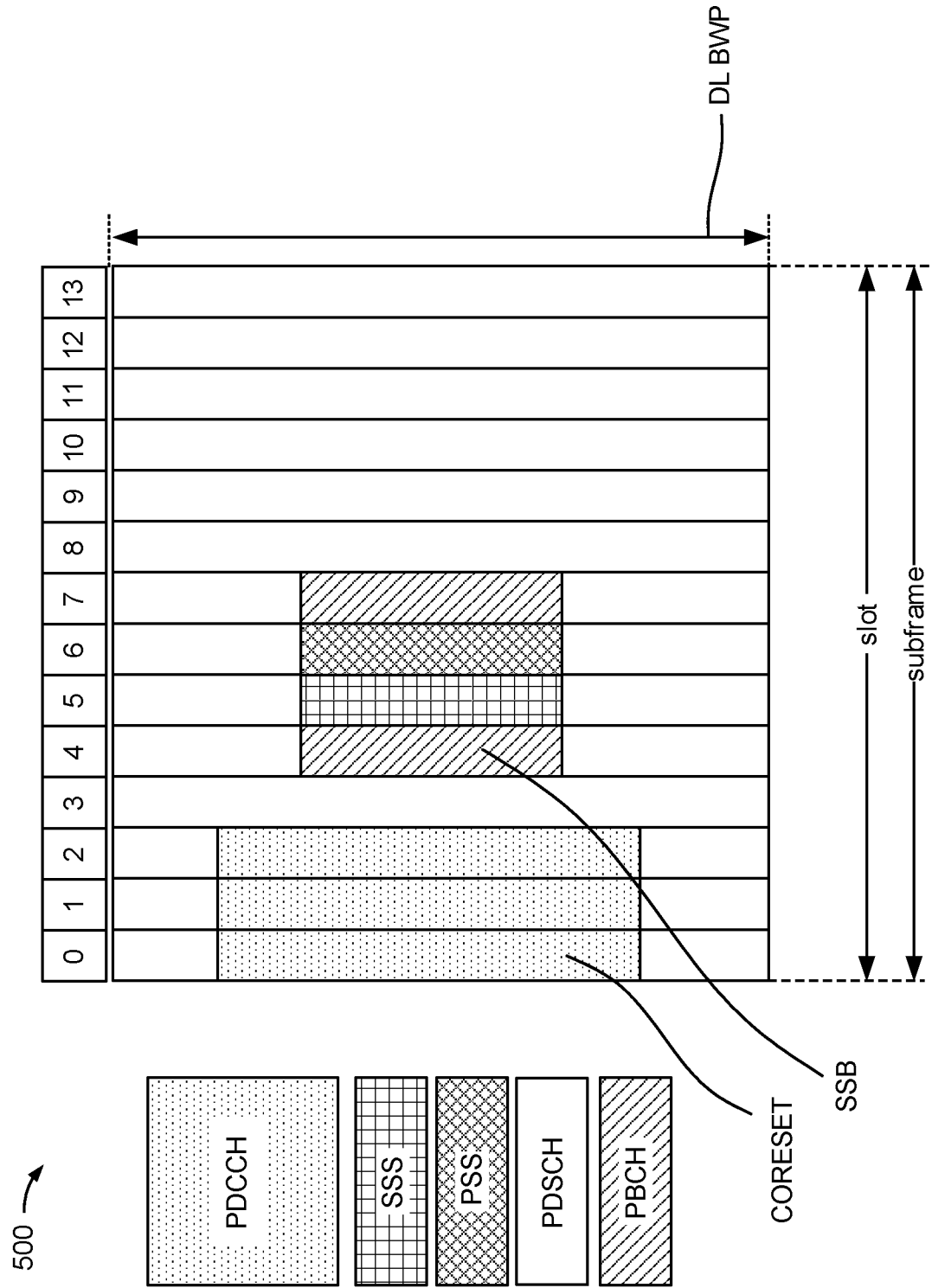
FIG. 5 is a diagram illustrating various downlink channels within an example downlink slot, according to aspects of the disclosure.

FIG. 5 is a diagram 500 illustrating various downlink channels within an example downlink slot. In FIG. 5, time is represented horizontally (on the X axis) with time increasing from left to right, while frequency is represented vertically (on the Y axis) with frequency increasing (or decreasing) from bottom to top. In the example of FIG. 5, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

Figure 6:
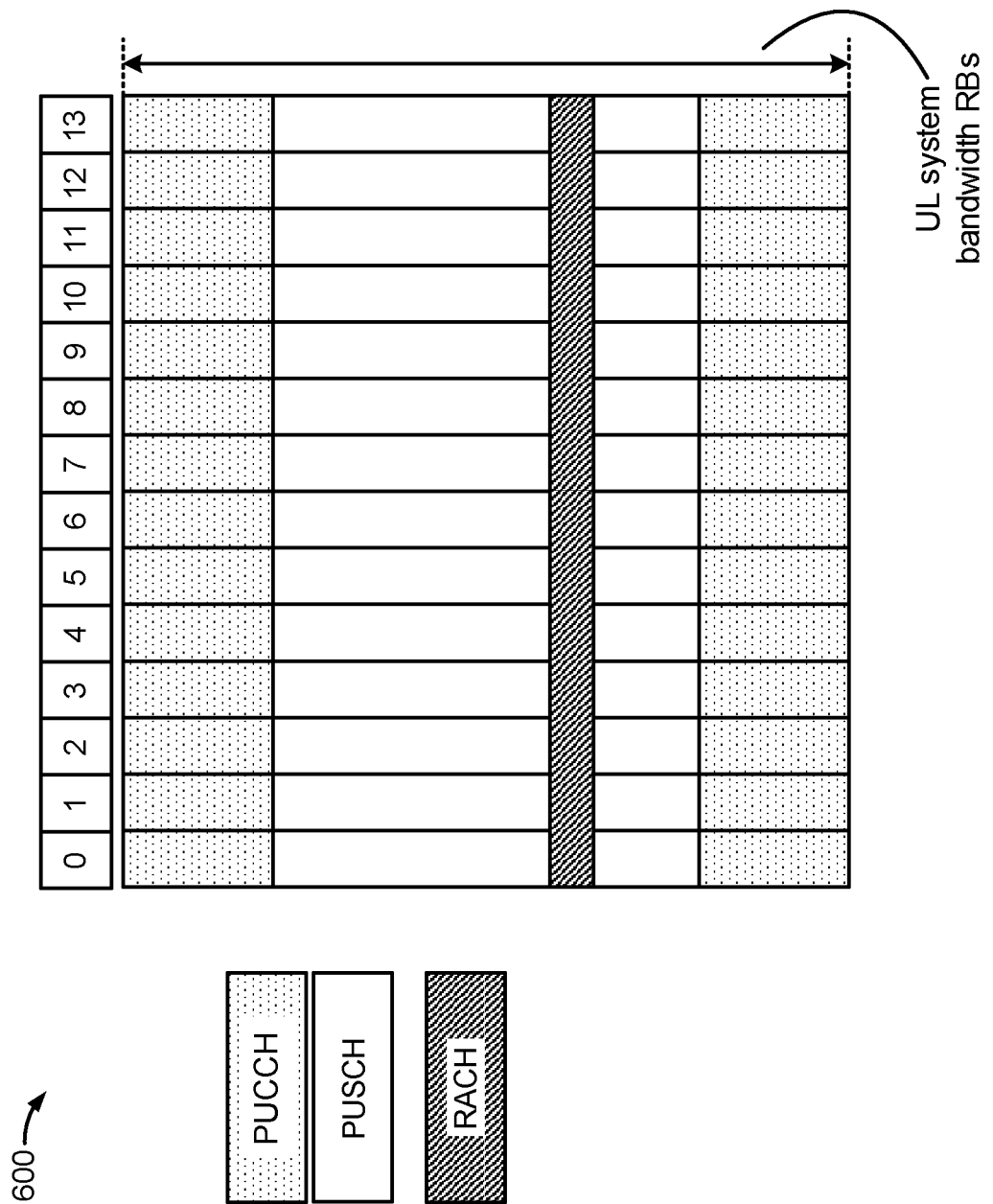
FIG. 6 is a diagram illustrating various uplink channels within an example uplink slot, according to aspects of the disclosure.

FIG. 6 is a diagram 600 illustrating various uplink channels within an example uplink slot. In FIG. 6, time is represented horizontally (on the X axis) with time increasing from left to right, while frequency is represented vertically (on the Y axis) with frequency increasing (or decreasing) from bottom to top. In the example of FIG. 6, a numerology of 15 kHz is used. Thus, in the time domain, the illustrated slot is one millisecond (ms) in length, divided into 14 symbols.

A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Figure 7:
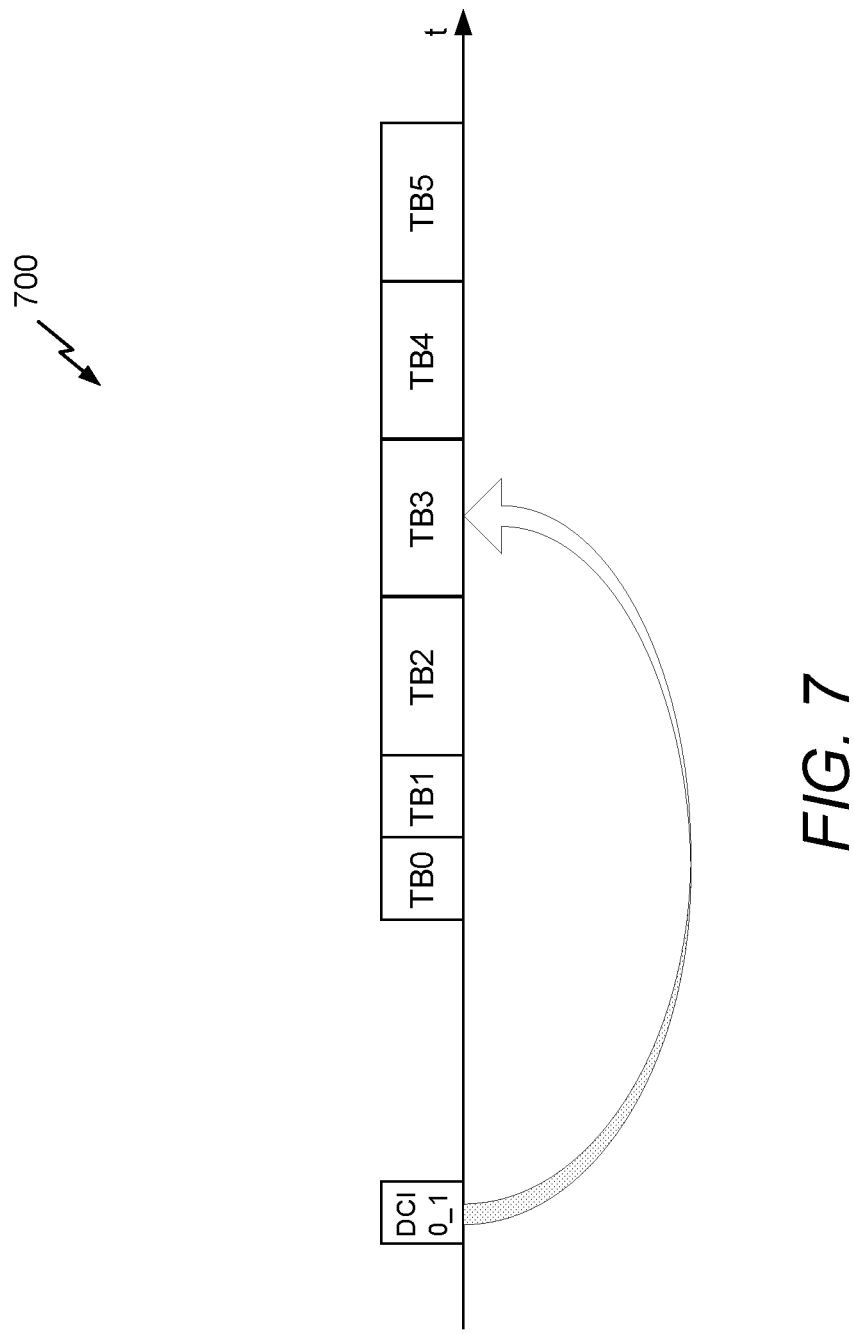
FIG. 7 illustrates a scheduling scheme in accordance with an aspect of the disclosure.

FIG. 7 illustrates a scheduling scheme 700 in accordance with an aspect of the disclosure. In particular, the scheduling scheme 700 depicts multiple back-to-back PUSCHs (in respective TBs) granted by the same DCI, with shared parameters. In 3GPP Rel. 16, multi-PUSCH grant is supported for NR. Multiple continuous PUSCHs with separate TBs (e.g., TB0-TB5 in FIG. 7) can be scheduled by a single DCI (e.g., DCI 0_1) over multiple slots/mini-slots. Each TB is mapped to at most one slot or one mini-slot. Different PUSCHs can have different lengths, but are contiguous in time domain. Most parameters shared, except HARQ process ID, RVID, NDI, time domain resource assignment (TDRA). Advantages for NRU (unlicensed) operation include:

Avoid scheduling gap between UL DCI grant and PUSCH transmissions during COT (channel occupancy time) after UE acquires the channel.

Reduce DCI signaling overhead.

In case of LBT (listen before talk) failure for one or more TBs, the UE can keep trying LBT for remaining TBs without need of additional grants from gNB.

In 3GPP Rel. 16, rules for overlapping resource allocations are defined. For example, in TS 38.213, for operation on a single carrier in unpaired spectrum, if a UE is configured by higher layers to receive a PDCCH, or a PDSCH, or a CSI-RS, or a DL PRS in a set of symbols of a slot, the UE receives the PDCCH, the PDSCH, the CSI-RS, or the DL PRS if the UE does not detect a DCI format that indicates to the UE to transmit a PUSCH, a PUCCH, a PRACH, or a SRS in at least one symbol of the set of symbols of the slot; otherwise, the UE does not receive the PDCCH, or the PDSCH, or the CSI-RS, or the DL PRS in the set of symbols of the slot. For a set of symbols of a slot that are indicated to a UE as flexible by tdd-UL-DL-ConfigurationCommon, and tdd-UL-DL-ConfigurationDedicated if provided, the UE does not expect to receive both dedicated higher layer parameters configuring transmission from the UE in the set of symbols of the slot and dedicated higher layer parameters configuring reception by the UE in the set of symbols of the slot. In another example, in TS 38.214, for any HARQ process ID(s) in a given scheduled cell, the UE is not expected to receive a PDSCH that overlaps in time with another PDSCH. For any HARQ process ID(s) in a given scheduled cell, the UE is not expected to transmit a PUSCH that overlaps in time with another PUSCH.

Figure 8A:
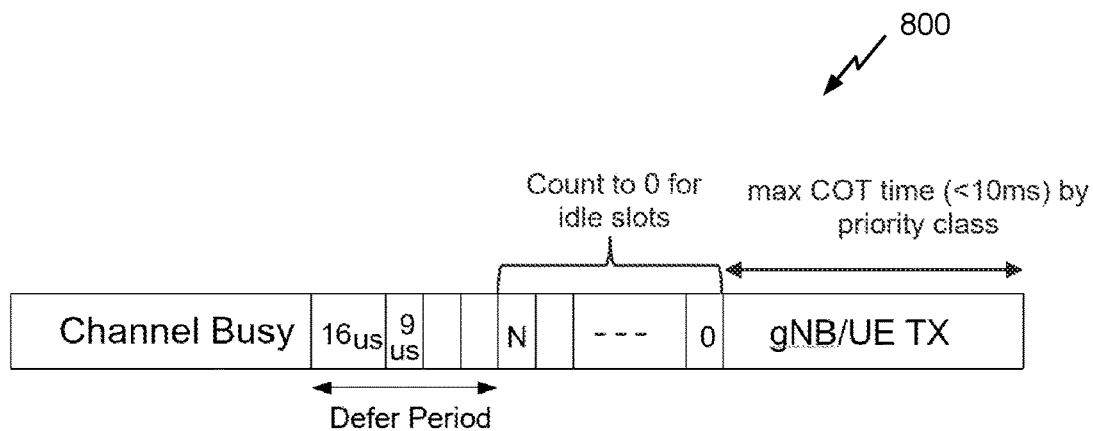
FIGS. 8A-8C illustrate respective LBT procedures that are performed in NRU under 6 GHz in accordance with aspects of the disclosure.
Figure 8B:
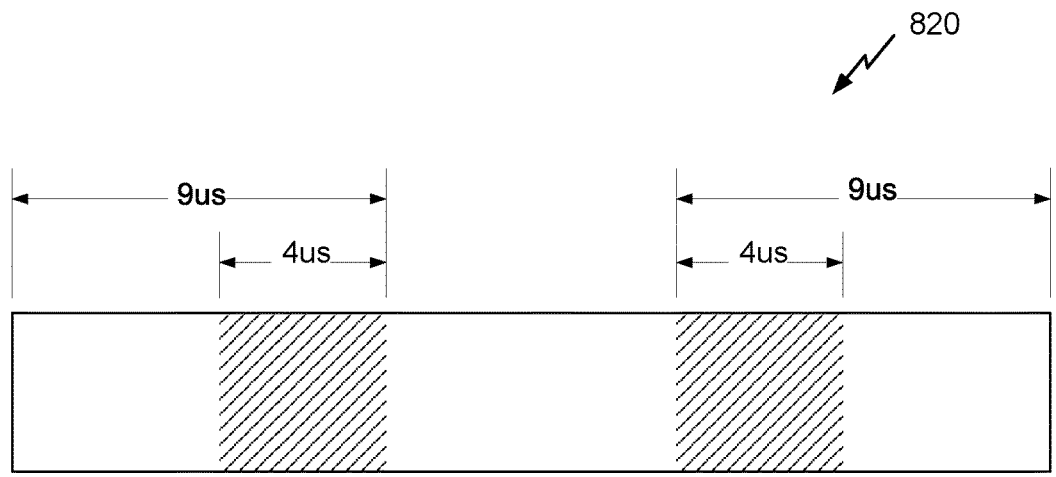
Figure 8C:
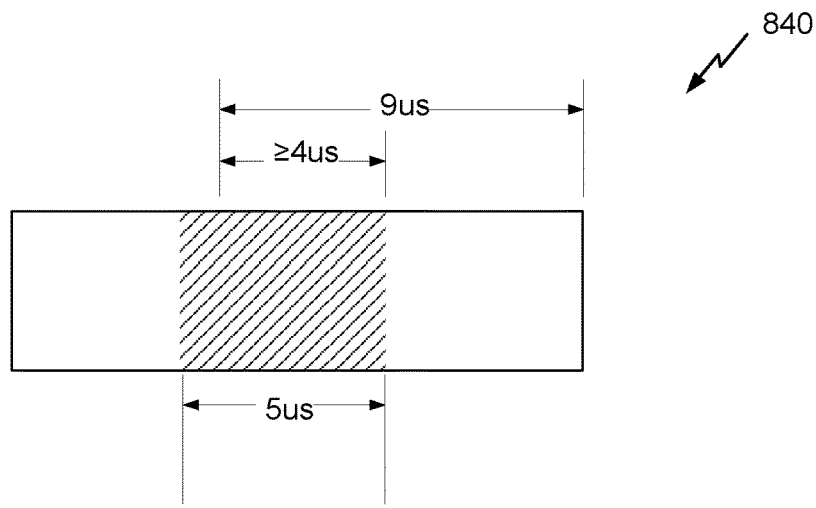

FIGS. 8A-8C illustrate respective LBT procedures 800, 820 and 840 that are performed in NRU under 6 GHz in accordance with aspects of the disclosure. Generally, for load-based LBT, a "Type 1" procedure is initiated by gNB or UE; and a channel occupancy time (COT) sharing to responding node via Type2. In Type 1 LBT procedures, a random count-down procedure is implemented based on a contention window. FIG. 8A illustrates an example implementation of a Type 1 LBT procedure 800 in accordance with aspects of the disclosure. In Type 2 LBT procedures (which may include a Type 2A, Type 2B or Type 2C), fixed sensing interval of 25 us or 16 us with gap constraints, and LBT for discovery signal can be initiated by gNB via Type 2 under specified conditions. FIG. 8B illustrates an example implementation of a 25 us Type 2A LBT procedure 820 in accordance with aspects of the disclosure, and FIG. 8C illustrates an example implementation of a 16 us Type 2B LBT procedure 840 in accordance with aspects of the disclosure.

Figure 8D:
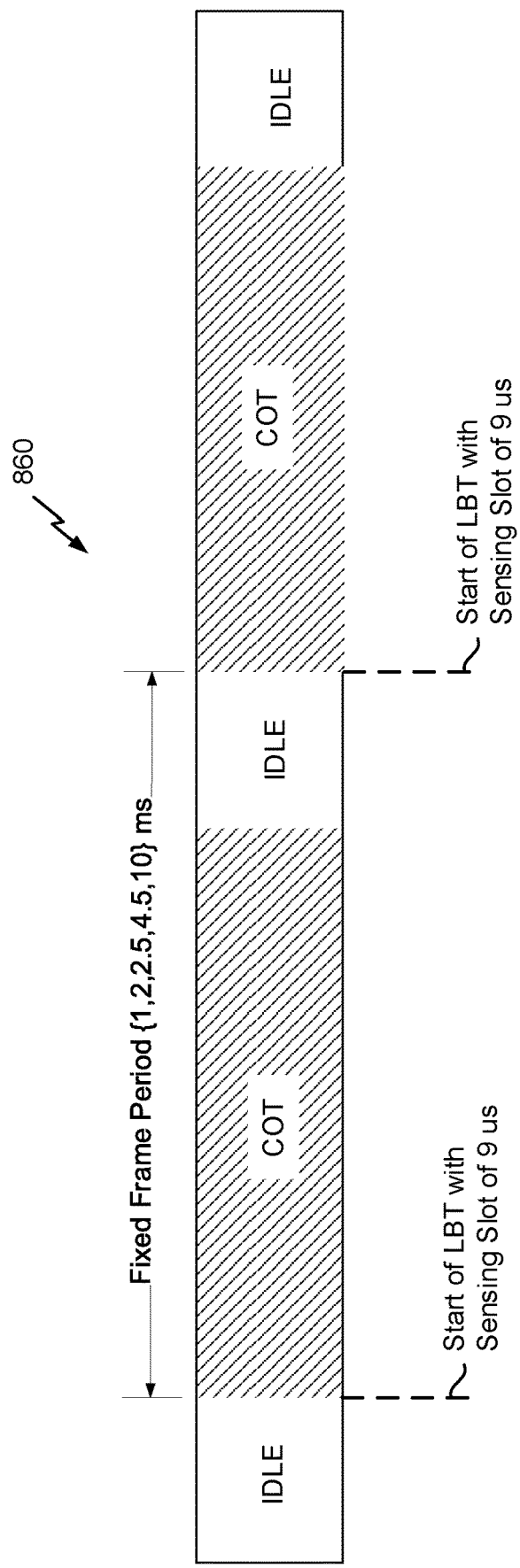
FIG. 8D illustrates a frame-based LBT procedure in accordance with aspects of the disclosure.

In some designs, frame-based LBT may be implemented, whereby LBT initiated by gNB with a fixed frame structure with COT sharing between gNB and UE. In some designs, frame-based LBT is intended for environments with long-term absence of other technologies guaranteed by regulation or policy, e.g., coordinated sensing to achieve reuse one within the same network. FIG. 8D illustrates a frame-based LBT procedure 860 in accordance with aspects of the disclosure. In FIG. 8D, LBT is performed within COT with a sensing slot of 9 us if a gap is greater than 16 us.

Figure 9:
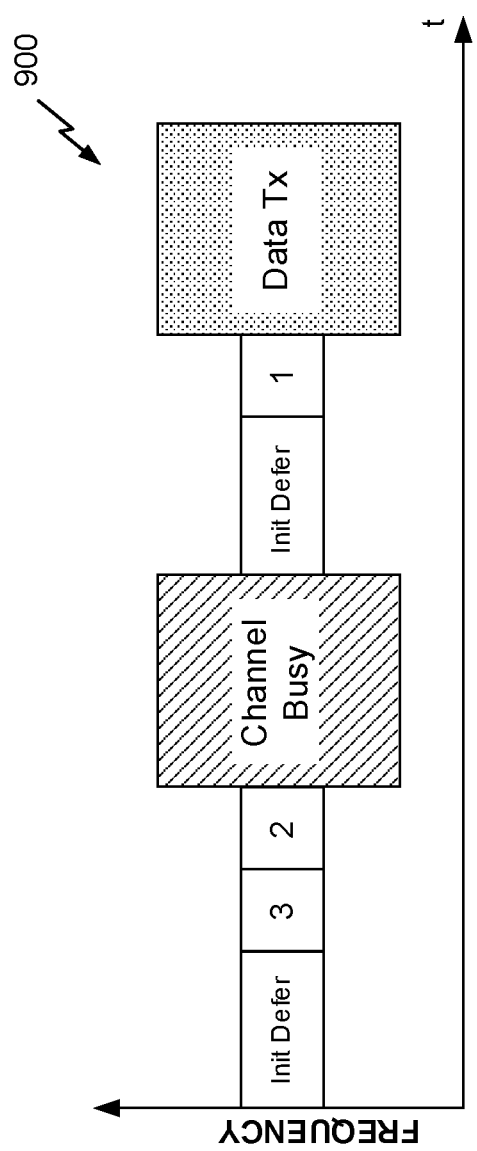
FIG. 9 illustrates an example communication scheme for NRU at 60 GHz in accordance with aspects of the disclosure.

In some designs, NRU may be configured for operation at 60 GHz band. FIG. 9 illustrates an example communication scheme 900 for NRU at 60 GHz in accordance with aspects of the disclosure. As noted above, SCS=120 KHz, 480 KHz, or 960 KHz, (1 slot=125 us, 31.25 us, or 15.625 us, respectively). In FIG. 9, more options for LBT may be implemented, such as No-LBT, energy-detection based LBT, RX-assisted LBT, directional LBT, LBT for COT with multi-beams etc. In some designs, the communication scheme 900 may be implemented without gap constraints within a COT (unlike NRU for sub7 GHz). In some designs, a baseline by ETSI EN 302 567 may be implemented, e.g.:

eCCA: LBT with random count-down: 0-3 sensing slots. Initial deferral: 8 us; Sensing slot: 5 us; maxCOT<5 ms No-LBT of short control signaling.

Low-duty cycle: up to 10 ms occupation within 100 ms observation period.

Conventional resource grants (e.g., PUSCH, PDSCH, etc.) are typically granted by a base station to one or more UEs, and thereafter left unchanged. For example, in 3GPP Rel. 16, rules for overlapping allocations may include:

UE will not receive PDCCH over flexible symbols if PDCCH overlaps with dynamic scheduled PUSCH via DCI.

Overlapping unicast PDSCH+PDSCH (or overlapping unicast PUSCH+PUSCH) is not expected for a UE.

Overlapping semi-static allocated PDSCH+PUSCH is not expected for a given UE.

Regarding overlapping dynamic scheduled PDSCH+PUSCH over flexible symbols, no rules are explicitly specified.

UE's behavior is not specified, and most likely, the $2^{nd}$ dynamic grant with overlapping resources with $1^{st}$ dynamic grant of different DL/UL direction will be treated as an error case and ignored by UE.

Accordingly, in 3GPP Rel. 16, dynamically allocated resources for UL TX over flexible symbols cannot be overridden for DL communication.

For some resource grants, a point may be reached where the purpose of a respective resource grant is achieved early (i.e., before all resources associated with the respective resource grant have been used). In this case, any remaining resource(s) are wasted or left unused, or may be used in a way that increases interference (e.g., gNB continues to send PDSCH repetitions after UE has decoded PDSCH, or UE continues to send PUSCH repetitions after gNB has decoded PUSCH).

Some conventional resource grants may be made conditional in terms of timing. For example, in LTE-enhanced License Assisted Access (LAA), two-stage UL grant feature is defined, where a PUSCH grant is transmitted ahead of time without starting time information, and later triggered with a C-PDCCH is transmitted. Another example is the non-numerical K1 feature for PUCCH HARQ feedback for NRU (e.g., if DL grant indicates this non-numerical K1 as PUCCH reporting time, the UE will hold on the A/N report till the gNB provides a normal K1 in a later DL grant, e.g., the later grant can be in the next gNB COT).

While some resource grants may be made conditional in terms of timing, the same amount of resources are ultimately consumed by the respective resource grants, and the nature of the resource grants (e.g., for PUSCH, PDSCH, PUCCH, etc.) remains unchanged). Aspects of the disclosure are directed to conditional grant(s) that override at least some part of another resource grant. Such aspects may provide various technical advantages, such as improved resource utilization based on dynamic conditions (e.g., reduced spectral interference from unnecessary transmission repetitions, etc.), lower latency (e.g., can apply change to previous grant in time upon triggering conditions), and so on.

Figure 10:
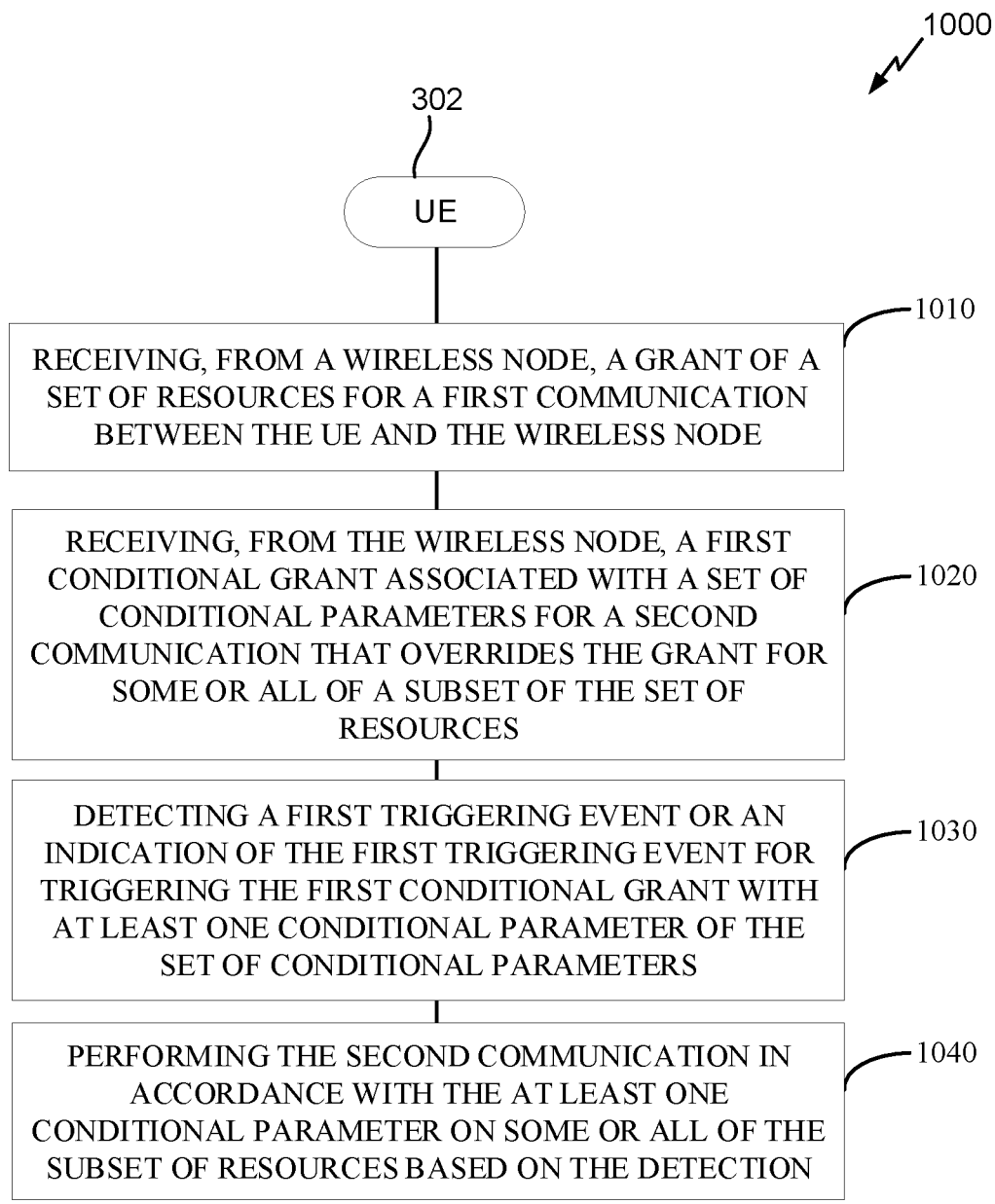
FIG. 10 illustrates an exemplary process of wireless communication, according to aspects of the disclosure.

FIG. 10 illustrates an exemplary process 1000 of wireless communication, according to aspects of the disclosure. In an aspect, the process 1000 may be performed by UE 302.

Referring to FIG. 10, at 1010, UE 302 (e.g., receiver 312 or 322, etc.) receives, from a wireless node (e.g., UE 302 in case or sidelink, or BS 304 in case of DL/UL), a grant of a set of resources for a first communication between the UE and the wireless node. As will be disclosed below in more detail, the first communication may be an uplink, downlink or sidelink communication, and the set of resources may correspond to time-frequency resource(s), spatial resource(s), etc.

Referring to FIG. 10, at 1020, UE 302 (e.g., receiver 312 or 322, etc.) receives, from the wireless node, a first conditional grant associated with a set of conditional parameters for a second communication that overrides the grant for some or all of a subset of the set of resources. In some designs, the first conditional grant may be received in conjunction with the grant (e.g., in same DCI or SCI), while in other designs, the first conditional grant may be received separately from the grant (e.g., separate DCIs or SCIs). In the latter case, the grant may follow the first conditional grant, or alternatively the first conditional grant may follow the grant.

Referring to FIG. 10, at 1030, UE 302 (e.g., receiver 312 or 322, processor(s) 332, grant module 342, etc.) detects a first triggering event or an indication of the first triggering event for triggering the first conditional grant with at least one conditional parameter of the set of conditional parameters. Various examples of triggering events (and how such triggering events can be indicated to UE 302 in case a respective triggering event cannot be locally detected at UE 302, such as a successful decoding operation at the wireless node) will be described below in greater detail.

Referring to FIG. 10, at 1040, UE 302 (e.g., receiver 312 or 322, transmitter 314 or 324, etc.) performs the second communication in accordance with the at least one conditional parameter on some or all of the subset of resources based on the detection. As will be disclosed below in more detail, the second communication may be an uplink, downlink or sidelink communication.

Figure 11:
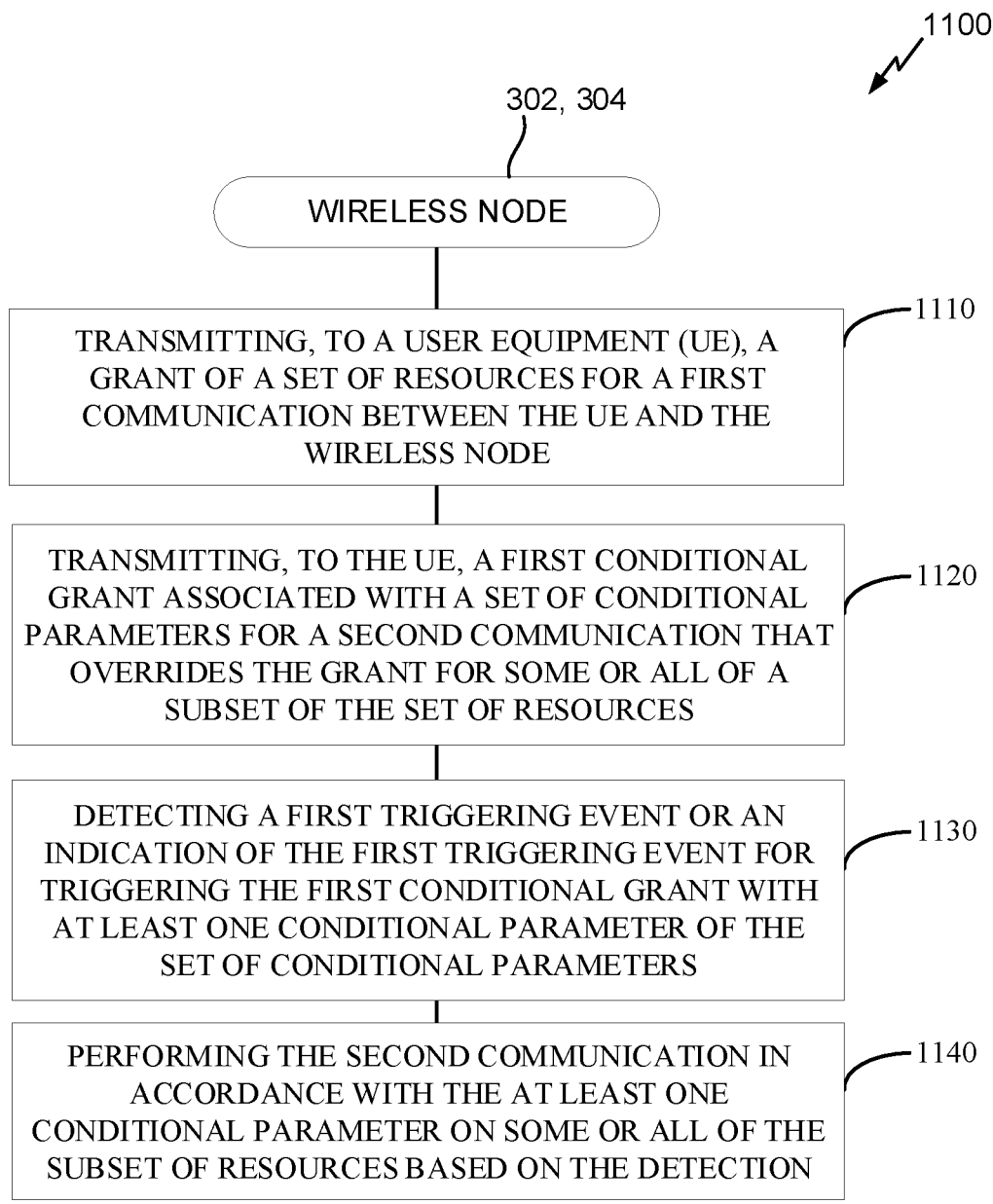
FIG. 11 illustrates an exemplary process of wireless communication, according to aspects of the disclosure.

FIG. 11 illustrates an exemplary process 1100 of wireless communication, according to aspects of the disclosure. In an aspect, the process 1100 may be performed by UE 302 (e.g., in case of a sidelink UE sending a sidelink grant or reservation request) or BS 304.

Referring to FIG. 11, at 1110, the wireless node (e.g., transmitter 314 or 324 or 354 or 364, etc.) transmits, to a UE (e.g., the UE performing the process 1000 of FIG. 10), a grant of a set of resources for a first communication between the UE and the wireless node. As will be disclosed below in more detail, the first communication may be an uplink, downlink or sidelink communication, and the set of resources may correspond to time-frequency resource(s), spatial resource(s), etc.

Referring to FIG. 11, at 1120, the wireless node (e.g., transmitter 314 or 324 or 354 or 364, etc.) transmits, to the UE, a first conditional grant associated with a set of conditional parameters for a second communication that overrides the grant for some or all of a subset of the set of resources. In some designs, the first conditional grant may be transmitted in conjunction with the grant (e.g., in same DCI or SCI), while in other designs, the first conditional grant may be received separately from the grant (e.g., separate DCIs or SCIs). In the latter case, the grant may follow the first conditional grant, or alternatively the first conditional grant may follow the grant.

Referring to FIG. 11, at 1130, the wireless node (e.g., receiver 352 or 362, processor(s) 384, grant module 388, etc.) detects a first triggering event or an indication of the first triggering event for triggering the first conditional grant with at least one conditional parameter of the set of conditional parameters. Various examples of triggering events (and how such triggering events can be indicated to the wireless node in case a respective triggering event cannot be locally detected at the wireless node, such as a successful decoding operation at the UE) will be described below in greater detail.

Referring to FIG. 11, at 1140, the wireless node (e.g., receiver 352 or 362, transmitter 354 or 364, etc.) performs the second communication in accordance with the at least one conditional parameter on some or all of the subset of resources based on the detection. As will be disclosed below in more detail, the second communication may be an uplink, downlink or sidelink communication.

Referring to FIGS. 10-11, in some designs, the entity transmitting the first communication (e.g., UE or wireless node) may cancel, in response to the detection at 1030 or 1130, the first communication on some or all of the subset of resources.

Referring to FIGS. 10-11, in some designs, the first triggering event is based on one or more parameters with values that are not known when the first conditional grant is received. In some designs, the set of conditional parameters is unspecified in the first conditional grant, or the set of conditional parameters comprises a list of candidate values for the set of conditional parameters in the first conditional grant, or the set of conditional parameters comprises a range of candidate values for the set of conditional parameters in the first conditional grant, or a combination thereof. In some designs, the first triggering event is indicated by the first conditional grant, or pre-configured by a higher-layer messaging (e.g., RRC, MAC-CE, etc.), or pre-defined (e.g., in relevant standard).

Figure 12:
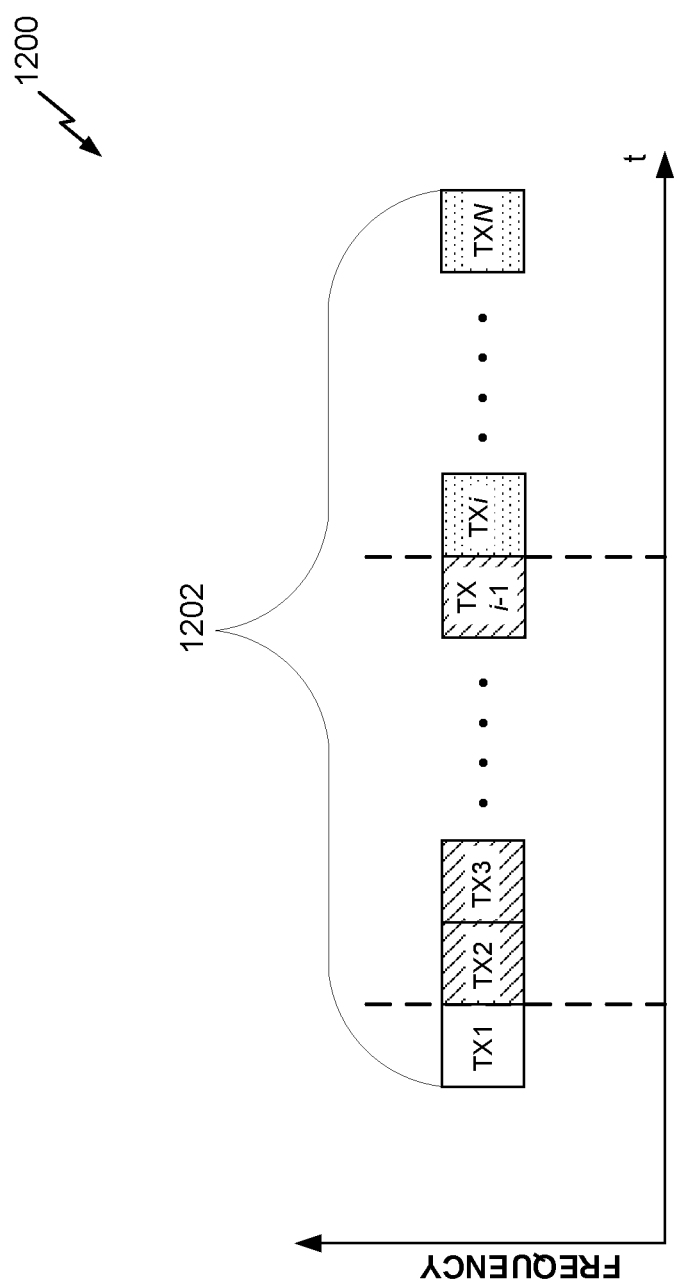
FIG. 12 illustrates an example implementation of the processes of FIGS. 10-11 in accordance with aspects of the disclosure.

FIG. 12 illustrates an example implementation 1200 of the processes 1000-1100 of FIGS. 10-11 in accordance with aspects of the disclosure. In the example of FIG. 12, the wireless node that performs the process 1100 of FIG. 11 corresponds to BS 304. In FIG. 12, a grant of a set of consecutive UL TX NRU resources 1202 is sent to a UE. The intent of the grant is to facilitate transmission attempts denoted as TX1, TX2, . . . TXN. In an example, the grant may be a multi-PUSCH grant, where TX1-TXN each carry a different transport block (TB). In some cases, the UE may complete transmission of its buffer data before TXN. In another example, the grant may be a multi-PUSCH grant with the transmission attempts being repetitions of a PUSCH, or a multi-PUCCH grant with the transmission attempts being repetitions of a PUCCH. In some cases, gNB may complete decoding of the PUSCH/PUCCH successfully before TXN.

Referring to FIG. 12, assume that TX1 is skipped due to LBT failure, and the UE transmits (after clearing LBT) PUSCH/PUCCH from TX2-TX$_{i-1}$. Further assume that after TX$_{i-1}$, one of the above-noted conditions (e.g., UE has cleared buffer data or gNB has decoded PUSCH/PUCCH) is satisfied. In this case, the remaining resources (e.g., TX$_{i-1}$-TXN) have been overallocated. In accordance with the processes 10-11, some or all of these overallocated resources may be repurposed via the first conditional grant.

Referring to FIG. 12, in some designs, in the case of consecutive UL TX in NRU, a conditional grant with DL allocation can be sent before the start of UL TXs to override the potential overallocated UL resources for DL communication. In some designs, the triggering condition for applying the conditional grant can be indicated by the conditional grant, e.g.:

The starting time for DL TX is indicated as Kth Tx after 1$^{st}$ UE TX within a range of scheduled or configured consecutive UL TXs.

For multi-PUSCH grant: The value "K" can be determined based on UE's latest buffer status report received before multi-PUSCH grant.

For PUSCH repetition: The value "K" can be determined based on link quality.

In this way, both gNB and UE know when to use the conditional grant based on the 1$^{st}$ UE TX after successful LBT.

Note that for the case of PUSCH repetition, the overallocated UL resources can be reallocated for a new communication, which can be DL or UL communication.

Accordingly, as shown in FIG. 12, the first communication (e.g., TX2-TXi-1) may include multiple transmissions of a scheduled or configured PUSCH, and the consecutive uplink transmissions are each associated with a different TB. Alternatively, the first communication (e.g., TX2-TXi-1) may include multiple repetitions of a scheduled or configured PUSCH or PUCCH, where the consecutive uplink transmissions are repetitions of the same transport block (TB). Also, the first triggering event may include an initial contention-based transmission of the first communication subject to listen before talk (LBT), and where a starting time for the second communication is offset from the initial contention-based transmission.

Figure 13:
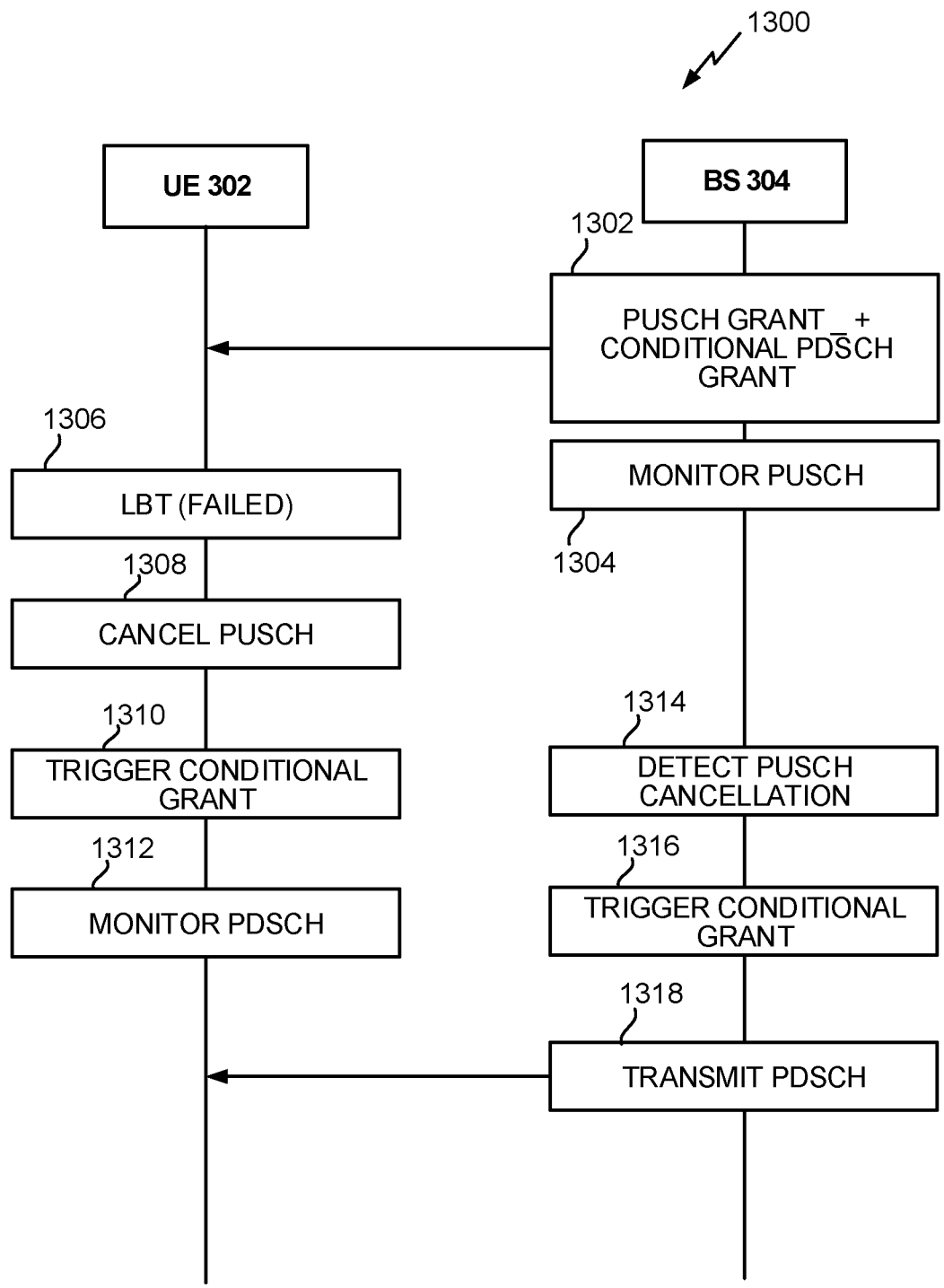
FIG. 13 illustrates an example implementation of the processes of FIGS. 10-11 in accordance with aspects of the disclosure.

FIG. 13 illustrates an example implementation 1300 of the processes 1000-1100 of FIGS. 10-11 in accordance with aspects of the disclosure. In the example of FIG. 13, the wireless node that performs the process 1100 of FIG. 11 corresponds to BS 304.

Referring to FIG. 13, at 1302, BS 304 transmits PUSCH grant plus a conditional PDSCH grant to UE 302. As noted above, the respective grants can be transmitted together or separately, and in either order. At 1304, BS 304 monitors for PUSCH on resource(s) associated with the PUSCH grant. At 1306, assume that LBT fails (e.g., too much contention on channel), and UE 302 cancels PUSCH at 1308. At 1310, the PUSCH cancellation at 1308 triggers the first conditional grant, and UE 302 begins to monitors the PDSCH associated with the conditional PDSCH grant at 1312. At 1314, BS 304 detects an indication of the PUSCH cancellation (e.g., based on energy in a front-loaded DMRS being below a threshold). At 1316, the detected indication of the PUSCH cancellation at 1314 triggers the first conditional grant, and BS 304 begins to transmit PDSCH associated with the conditional PDSCH grant at 1318 (e.g., which is received at UE 302 based on the PDSCH monitoring from 1312). Accordingly, in FIG. 13, the first triggering event may include cancellation of the first communication (e.g., PUSCH) on the subset of resources.

Referring to FIG. 13, in some designs, a starting time of PDSCH allocation in the first conditional grant can be indicated as [x] symbols after starting symbol of PUSCH with LBT failure. As noted above, gNB can detect cancellation of PUSCH, e.g. based on energy of front-located DMRS below a threshold. In this case, the value of [x] can be chosen to accommodate gNB's detection time.

Figure 14:
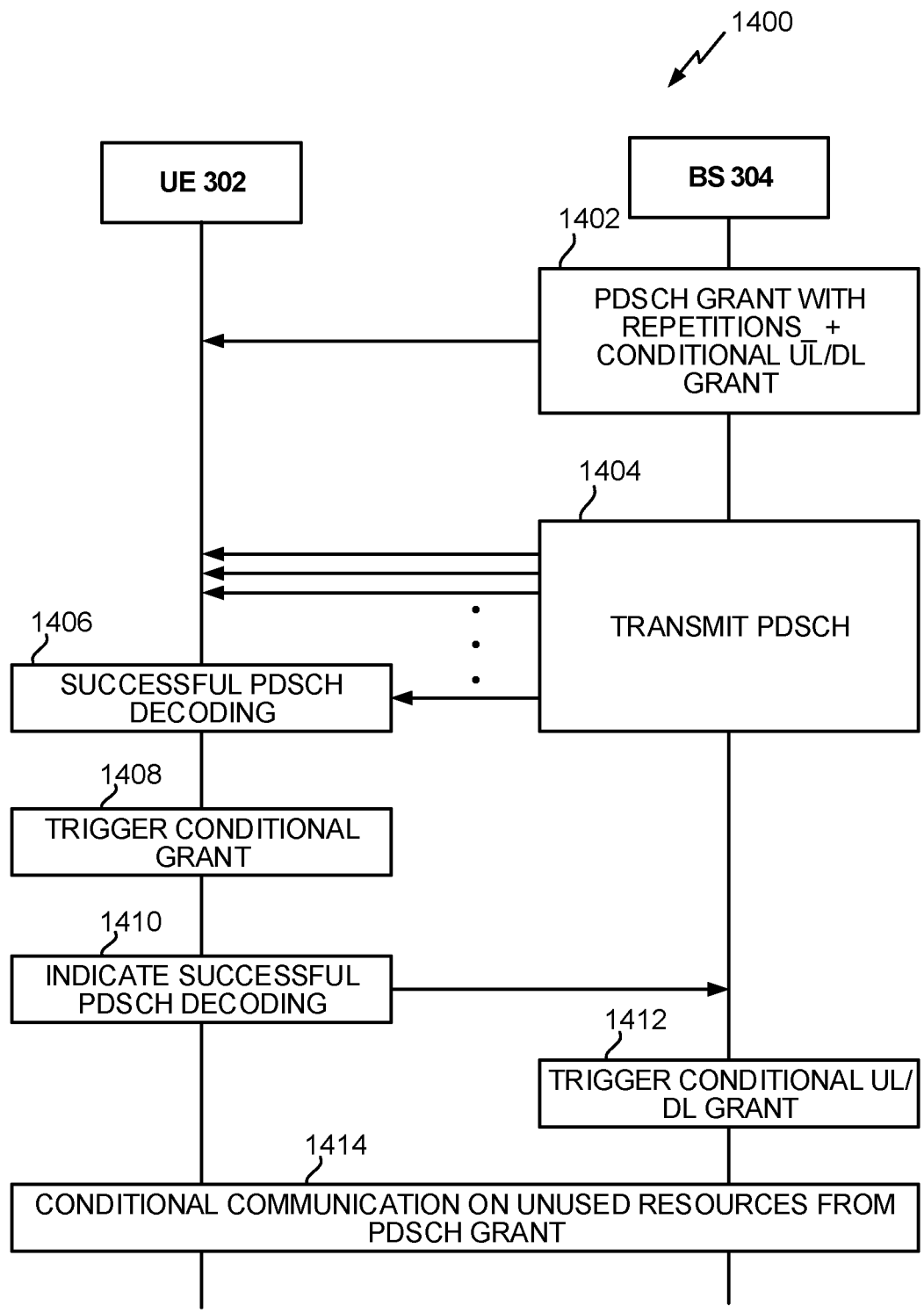
FIG. 14 illustrates an example implementation of the processes of FIGS. 10-11 in accordance with aspects of the disclosure.

FIG. 14 illustrates an example implementation 1400 of the processes 1000-1100 of FIGS. 10-11 in accordance with aspects of the disclosure. In the example of FIG. 14, the wireless node that performs the process 1100 of FIG. 11 corresponds to BS 304.

Referring to FIG. 14, BS 304 transmits PDSCH grant with repetitions plus a conditional UL or DL grant (e.g., PDSCH, PUSCH, PUCCH, etc.) to UE 302. As noted above, the respective grants can be transmitted together or separately, and in either order. At 1404, BS 304 begins transmission of a series of PDSCH repetitions. At 1406, UE 302 eventually successfully decodes the PDSCH. At 1408, the successful decoding of PDSCH at 1406 triggers the first conditional grant, and, at 1410, UE 302 provides an indication of the successful PDSCH decoding to BS 304. At 1412, the indication of the successful decoding of PDSCH at 1410 triggers the first conditional grant, and after, at 1414, which the second communication is communicated on some of the unused resources from the PDSCH grant. By contrast, as noted above with respect to 3GPP Rel. 16, HARQ feedback can only be done after repetition (e.g., overlapping PDSCH+PDSCH or PDSCH+PUSCH not supported in 3GPP Rel. 16).

Accordingly, in FIG. 14, the first communication includes multiple repetitions of a PDSCH. Also, the first triggering event includes successful decoding of the PDSCH at the UE, and the subset of resources for the second communication comprise a plurality of PUCCH candidate resources.

Referring to FIG. 14, in some designs, the first communication may include multiple repetitions of a PDSCH. In some designs, in terms of timing, the UE may begin transmission of the second communication with PUCCH feedback on an earliest candidate resource following the successful decoding of the PDSCH, or, based on a second conditional grant for a third communication, the UE may begin communication of the third communication comprising a next downlink or uplink communication on a resource based on a time offset following the successful decoding of the PDSCH. Alternatively, in some designs, the UE begins transmission of the second communication comprising PUCCH feedback on an earliest candidate resource following the successful decoding of the PDSCH, and, based on a second conditional grant for a third communication, the UE begins communication of the third communication comprising a next downlink or uplink communication on a resource based on a time offset following the successful decoding of the PDSCH.

Referring to FIG. 14, in some designs, for a use of PDSCH repetition with early termination, the first conditional grant may be for a next UL communication after UE's early termination. In some designs, the triggering condition for applying the first conditional grant can be pre-defined in spec, or pre-configured by RRC or MAC-CE message or indicated by conditional grant, e.g. staring time for UL TX can be N (e.g. N=1 or 2) slots/mini-slots after the slot/mini-slot with successful decoding and still overlaps with PDSCH repetition. In some designs, this option may be applicable for gNB with full-duplex capability. In some designs, since gNB does not know when the triggering condition will happen in advance, gNB with full-duplex capability can monitor potential UL TX from UE at the same time of doing PDSCH repetition, and once gNB detects UL TX from UE, e.g. from PUSCH DMRS based on conditional grant, gNB can stop DL TX for PDSCH repetition.

Referring to FIG. 14, in some designs as noted above, separate conditional grants may be provided to the UE. For example, a $1^{st}$ conditional grant for PUCCH feedback on UE's early termination, and $2^{nd}$ conditional grant for next DL or UL communication after UE's early termination. In some designs, the triggering condition for applying the $1^{st}$ conditional grant can be the same as described above with respect to FIG. 14 (e.g., successful PDSCH decoding). In some designs, the triggering condition for applying the $2^{nd}$ conditional grant can be based on application of $1^{st}$ conditional grant, e.g. starting time of next DL or UL communication can be the next slot/mini-slot after transmission of PUCCH feedback on early termination.

Referring to FIGS. 10-11, in some designs (e.g., a reversed operation from FIG. 14), the first communication comprises multiple repetitions of a PUSCH. In some designs, the first triggering event includes successful decoding of the PUSCH at the wireless node, and the subset of resources for the second communication comprise a plurality of PDCCH candidate resources. In some designs, the UE monitors for the second communication including PDCCH on the plurality of PDCCH candidate resources (e.g., hypothesis testing). In some designs, based on a second conditional grant for a third communication, the UE begins communication of the third communication comprising a next downlink or uplink communication on a resource based on a time offset following receipt of the PDCCH.

Referring to FIGS. 10-11, in some designs, a dual connected (DC) UE/MT may have spatial duplex mode (SDM)/time duplex mode (TDM) limitations across two parent-links. Without prior semi-static coordination (which is inefficient) or dynamic coordination (which has large overhead and may not even be feasible), the two parents may effectively compete to grab resources to talk to their common child. Instead, a more accommodating parent may be ok to leave a few options to the child-node by sending a conditional grant.

As noted above, the first and second communications can be of various types. Besides access networks of UL/DL communication, conditional grants can be implemented with respect to other types of networks, e.g. sidelink with PC5, IAB network, etc. In an example, in sidelink Mode 2, a scheduling UE may reserve more than necessary resource into the future via SCI grant to a scheduled UE, and the conditional grant can also be used to override or modify a previously overbooked SCI grant for other usage. For access network, the scheduling node can be gNB, the scheduled node can an access UE, and the conditional grant can be a DCI grant or RRC-configured grant. For IAB network, scheduling node can be a parent node of an IAB-node, the scheduled node can an IAB-node MT. The conditional grant can be a DCI grant or RRC-configured grant. For network with PC5 sidelink, both the scheduling node and scheduled node can be access UEs, and the conditional grant can be a SCI grant.

Referring to FIGS. 10-11, in some designs, the at least one conditional parameter may include one or more of a starting time of the subset of resources, a number of layers, a TCI state, a spatial relation indicator, RV, time and/or frequency location, etc. In some designs, the first conditional grant may be a dynamic, semi-persistent, or periodic grant. In some designs, the first conditional grant can be a separate grant or carried within the associated grant via extended field(s). In some designs, the first conditional grant and the associated grant can be associated with dedicated RNTI, search space etc.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: receiving, from a wireless node, a grant of a set of resources for a first communication between the UE and the wireless node; receiving, from the wireless node, a first conditional grant associated with a set of conditional parameters for a second communication that overrides the grant for some or all of a subset of the set of resources; detecting a first triggering event or an indication of the first triggering event for triggering the first conditional grant with at least one conditional parameter of the set of conditional parameters; and performing the second communication in accordance with the at least one conditional parameter on some or all of the subset of resources based on the detection.

Clause 2. The method of clause 1, further comprising: canceling, in response to the detection, the first communication on some or all of the subset of resources.

Clause 3. The method of any of clauses 1 to 2, wherein the first triggering event is based on one or more parameters with values that are not known when the first conditional grant is received.

Clause 4. The method of any of clauses 1 to 3, wherein the set of conditional parameters is unspecified in the first conditional grant, or wherein the set of conditional parameters comprises a list of candidate values for the set of conditional parameters in the first conditional grant, or wherein the set of conditional parameters comprises a range of candidate values for the set of conditional parameters in the first conditional grant, or a combination thereof.

Clause 5. The method of any of clauses 1 to 4, wherein the first triggering event is indicated by the first conditional grant, or pre-configured by a higher-layer messaging, or pre-defined.

Clause 6. The method of any of clauses 1 to 5, wherein the set of resources is associated with consecutive uplink transmissions in New Radio Unlicensed (NRU) spectrum.

Clause 7. The method of clause 6, wherein the first triggering event comprises cancellation of the first communication on the subset of resources.

Clause 8. The method of clause 7, further comprising: wherein the first communication comprises multiple transmissions of a scheduled or configured physical uplink shared channel (PUSCH), wherein the first triggering event comprises a demodulation reference signal (DMRS) that indicates the cancellation of the scheduled or configured PUSCH on the subset of resources due to listen before talk (LBT) failure, and wherein the second communication comprises physical downlink shared channel (PDSCH).

Clause 9. The method of any of clauses 6 to 8, wherein the first communication comprises multiple transmissions of a scheduled or configured physical uplink shared channel (PUSCH), and wherein the consecutive uplink transmissions are each associated with a different transport block (TB).

Clause 10. The method of any of clauses 6 to 9, wherein the first communication comprises multiple repetitions of a scheduled or configured physical uplink shared channel (PUSCH) or physical uplink control channel (PUCCH), and wherein the consecutive uplink transmissions are repetitions of the same transport block (TB).

Clause 11. The method of any of clauses 6 to 10, wherein the first triggering event comprises an initial contention-based transmission of the first communication subject to listen before talk (LBT), and wherein a starting time for the second communication is offset from the initial contention-based transmission.

Clause 12. The method of any of clauses 1 to 11, wherein the first communication comprises multiple repetitions of a physical downlink shared channel (PDSCH).

Clause 13. The method of clause 12, wherein the first triggering event includes successful decoding of the PDSCH at the UE, and wherein the subset of resources for the second communication comprise a plurality of physical uplink control channel (PUCCH) candidate resources.

Clause 14. The method of any of clauses 12 to 13, wherein the UE begins transmission of the second communication comprising PUCCH feedback on an earliest candidate resource following the successful decoding of the PDSCH, or wherein the UE begins communication of the second communication comprising a next downlink or uplink communication on a respective candidate resource based on a time offset following the successful decoding of the PDSCH.

Clause 15. The method of any of clauses 12 to 14, wherein the UE begins transmission of the second communication comprising PUCCH feedback on an earliest candidate resource following the successful decoding of the PDSCH, and wherein the UE, based on a second conditional grant for a third communication, begins communication of the third communication comprising a next downlink or uplink communication on a resource based on a time offset following the successful decoding of the PDSCH.

Clause 16. The method of any of clauses 1 to 15, wherein the first communication comprises multiple repetitions of a physical uplink shared channel (PUSCH).

Clause 17. The method of clause 16, wherein the first triggering event includes successful decoding of the PUSCH at the wireless node, and wherein the subset of resources for the second communication comprise a plurality of physical downlink control channel (PDCCH) candidate resources.

Clause 18. The method of clause 17, wherein the UE monitors for the second communication comprising PDCCH on the plurality of PDCCH candidate resources.

Clause 19. The method of any of clauses 17 to 18, wherein the UE, based on a second conditional grant for a third communication, begins communication of the third communication comprising a next downlink or uplink communication on a resource based on a time offset following receipt of the PDCCH.

Clause 20. The method of any of clauses 1 to 19, wherein the first communication corresponds to a downlink communication, an uplink communication, a sidelink communication, or a fronthaul communication.

Clause 21. The method of any of clauses 1 to 20, wherein the second communication corresponds to a downlink communication, an uplink communication, a sidelink communication, or a fronthaul communication.

Clause 22. The method of any of clauses 1 to 21, wherein the first conditional grant follows the grant.

Clause 23. The method of any of clauses 1 to 22, wherein the grant follows the first conditional grant.

Clause 24. A method of operating a wireless node, comprising: transmitting, to a user equipment (UE), a grant of a set of resources for a first communication between the UE and the wireless node; transmitting, to the UE, a first conditional grant associated with a set of conditional parameters for a second communication that overrides the grant for some or all of a subset of the set of resources; detecting a first triggering event or an indication of the first triggering event for triggering the first conditional grant with at least one conditional parameter of the set of conditional parameters; and performing the second communication in accordance with the at least one conditional parameter on some or all of the subset of resources based on the detection.

Clause 25. The method of clause 24, wherein the first triggering event is based on one or more parameters with values that are not known when the first conditional grant is received.

Clause 26. The method of any of clauses 24 to 25, wherein the set of conditional parameters is unspecified in the first conditional grant, or wherein the set of conditional parameters comprises a list of candidate values for the set of conditional parameters in the first conditional grant, or wherein the set of conditional parameters comprises a range of candidate values for the set of conditional parameters in the first conditional grant, or a combination thereof.

Clause 27. The method of any of clauses 24 to 26, wherein the set of resources is associated with consecutive uplink transmissions in New Radio Unlicensed (NRU) spectrum.

Clause 28. The method of any of clauses 24 to 27, wherein the first communication comprises multiple repetitions of a physical downlink shared channel (PDSCH) or a physical uplink shared channel (PUSCH).

Clause 29. A user equipment (UE), comprising: a memory; at least one transceiver; and at least one processor communicatively coupled to the memory and the at least one transceiver, the at least one processor configured to: receive, via the at least one transceiver, from a wireless node, a grant of a set of resources for a first communication between the UE and the wireless node; receive, via the at least one transceiver, from the wireless node, a first conditional grant associated with a set of conditional parameters for a second communication that overrides the grant for some or all of a subset of the set of resources; detect a first triggering event or an indication of the first triggering event for triggering the first conditional grant with at least one conditional parameter of the set of conditional parameters; and perform the second communication in accordance with the at least one conditional parameter on some or all of the subset of resources based on the detection.

Clause 30. The UE of clause 29, wherein the at least one processor is further configured to: cancel, in response to the detection, the first communication on some or all of the subset of resources.

Clause 31. The UE of any of clauses 29 to 30, wherein the first triggering event is based on one or more parameters with values that are not known when the first conditional grant is received.

Clause 32. The UE of any of clauses 29 to 31, wherein the set of conditional parameters is unspecified in the first conditional grant, or wherein the set of conditional parameters comprises a list of candidate values for the set of conditional parameters in the first conditional grant, or wherein the set of conditional parameters comprises a range of candidate values for the set of conditional parameters in the first conditional grant, or a combination thereof.

Clause 33. The UE of any of clauses 29 to 32, wherein the first triggering event is indicated by the first conditional grant, or pre-configured by a higher-layer messaging, or pre-defined.

Clause 34. The UE of any of clauses 29 to 33, wherein the set of resources is associated with consecutive uplink transmissions in New Radio Unlicensed (NRU) spectrum.

Clause 35. The UE of clause 34, wherein the first triggering event comprises cancellation of the first communication on the subset of resources.

Clause 36. The UE of clause 35, wherein the at least one processor is further configured to: wherein the first communication comprises multiple transmissions of a scheduled or configured physical uplink shared channel (PUSCH), wherein the first triggering event comprises a demodulation reference signal (DMRS) that indicates the cancellation of the scheduled or configured PUSCH on the subset of resources due to listen before talk (LBT) failure, and wherein the second communication comprises physical downlink shared channel (PDSCH).

Clause 37. The UE of any of clauses 34 to 36, wherein the first communication comprises multiple transmissions of a scheduled or configured physical uplink shared channel (PUSCH), and wherein the consecutive uplink transmissions are each associated with a different transport block (TB).

Clause 38. The UE of any of clauses 34 to 37, wherein the first communication comprises multiple repetitions of a scheduled or configured physical uplink shared channel (PUSCH) or physical uplink control channel (PUCCH), and wherein the consecutive uplink transmissions are repetitions of the same transport block (TB).

Clause 39. The UE of any of clauses 34 to 38, wherein the first triggering event comprises an initial contention-based transmission of the first communication subject to listen before talk (LBT), and wherein a starting time for the second communication is offset from the initial contention-based transmission.

Clause 40. The UE of any of clauses 29 to 39, wherein the first communication comprises multiple repetitions of a physical downlink shared channel (PDSCH).

Clause 41. The UE of clause 40, wherein the first triggering event includes successful decoding of the PDSCH at the UE, and wherein the subset of resources for the second communication comprise a plurality of physical uplink control channel (PUCCH) candidate resources.

Clause 42. The UE of any of clauses 40 to 41, wherein the UE begins transmission of the second communication comprising PUCCH feedback on an earliest candidate resource following the successful decoding of the PDSCH, or wherein the UE begins communication of the second communication comprising a next downlink or uplink communication on a respective candidate resource based on a time offset following the successful decoding of the PDSCH.

Clause 43. The UE of any of clauses 40 to 42, wherein the UE begins transmission of the second communication comprising PUCCH feedback on an earliest candidate resource following the successful decoding of the PDSCH, and wherein the UE, based on a second conditional grant for a third communication, begins communication of the third communication comprising a next downlink or uplink communication on a resource based on a time offset following the successful decoding of the PDSCH.

Clause 44. The UE of any of clauses 29 to 43, wherein the first communication comprises multiple repetitions of a physical uplink shared channel (PUSCH).

Clause 45. The UE of clause 44, wherein the first triggering event includes successful decoding of the PUSCH at the wireless node, and wherein the subset of resources for the second communication comprise a plurality of physical downlink control channel (PDCCH) candidate resources.

Clause 46. The UE of clause 45, wherein the UE monitors for the second communication comprising PDCCH on the plurality of PDCCH candidate resources.

Clause 47. The UE of any of clauses 45 to 46, wherein the UE, based on a second conditional grant for a third communication, begins communication of the third communication comprising a next downlink or uplink communication on a resource based on a time offset following receipt of the PDCCH.

Clause 48. The UE of any of clauses 29 to 47, wherein the first communication corresponds to a downlink communication, an uplink communication, a sidelink communication, or a fronthaul communication.

Clause 49. The UE of any of clauses 29 to 48, wherein the second communication corresponds to a downlink communication, an uplink communication, a sidelink communication, or a fronthaul communication.

Clause 50. The UE of any of clauses 29 to 49, wherein the first conditional grant follows the grant.

Clause 51. The UE of any of clauses 29 to 50, wherein the grant follows the first conditional grant.

Clause 52. A wireless node, comprising: a memory; at least one transceiver; and at least one processor communicatively coupled to the memory and the at least one transceiver, the at least one processor configured to: transmit, via the at least one transceiver, to a user equipment (UE), a grant of a set of resources for a first communication between the UE and the wireless node; transmit, via the at least one transceiver, to the UE, a first conditional grant associated with a set of conditional parameters for a second communication that overrides the grant for some or all of a subset of the set of resources; detect a first triggering event or an indication of the first triggering event for triggering the first conditional grant with at least one conditional parameter of the set of conditional parameters; and perform the second communication in accordance with the at least one conditional parameter on some or all of the subset of resources based on the detection.

Clause 53. The wireless node of clause 52, wherein the first triggering event is based on one or more parameters with values that are not known when the first conditional grant is received.

Clause 54. The wireless node of any of clauses 52 to 53, wherein the set of conditional parameters is unspecified in the first conditional grant, or wherein the set of conditional parameters comprises a list of candidate values for the set of conditional parameters in the first conditional grant, or wherein the set of conditional parameters comprises a range of candidate values for the set of conditional parameters in the first conditional grant, or a combination thereof.

Clause 55. The wireless node of any of clauses 52 to 54, wherein the set of resources is associated with consecutive uplink transmissions in New Radio Unlicensed (NRU) spectrum.

Clause 56. The wireless node of any of clauses 52 to 55, wherein the first communication comprises multiple repetitions of a physical downlink shared channel (PDSCH) or a physical uplink shared channel (PUSCH).

Clause 57. A user equipment (UE), comprising: means for receiving, from a wireless node, a grant of a set of resources for a first communication between the UE and the wireless node; means for receiving, from the wireless node, a first conditional grant associated with a set of conditional parameters for a second communication that overrides the grant for some or all of a subset of the set of resources; means for detecting a first triggering event or an indication of the first triggering event for triggering the first conditional grant with at least one conditional parameter of the set of conditional parameters; and means for performing the second communication in accordance with the at least one conditional parameter on some or all of the subset of resources based on the detection.

Clause 58. The UE of clause 57, further comprising: means for canceling, in response to the detection, the first communication on some or all of the subset of resources.

Clause 59. The UE of any of clauses 57 to 58, wherein the first triggering event is based on one or more parameters with values that are not known when the first conditional grant is received.

Clause 60. The UE of any of clauses 57 to 59, wherein the set of conditional parameters is unspecified in the first conditional grant, or wherein the set of conditional parameters comprises a list of candidate values for the set of conditional parameters in the first conditional grant, or wherein the set of conditional parameters comprises a range of candidate values for the set of conditional parameters in the first conditional grant, or a combination thereof.

Clause 61. The UE of any of clauses 57 to 60, wherein the first triggering event is indicated by the first conditional grant, or pre-configured by a higher-layer messaging, or pre-defined.

Clause 62. The UE of any of clauses 57 to 61, wherein the set of resources is associated with consecutive uplink transmissions in New Radio Unlicensed (NRU) spectrum.

Clause 63. The UE of clause 62, wherein the first triggering event comprises cancellation of the first communication on the subset of resources.

Clause 64. The UE of clause 63, further comprising: wherein the first communication comprises multiple transmissions of a scheduled or configured physical uplink shared channel (PUSCH), wherein the first triggering event comprises a demodulation reference signal (DMRS) that indicates the cancellation of the scheduled or configured PUSCH on the subset of resources due to listen before talk (LBT) failure, and wherein the second communication comprises physical downlink shared channel (PDSCH).

Clause 65. The UE of any of clauses 62 to 64, wherein the first communication comprises multiple transmissions of a scheduled or configured physical uplink shared channel (PUSCH), and wherein the consecutive uplink transmissions are each associated with a different transport block (TB).

Clause 66. The UE of any of clauses 62 to 65, wherein the first communication comprises multiple repetitions of a scheduled or configured physical uplink shared channel (PUSCH) or physical uplink control channel (PUCCH), and wherein the consecutive uplink transmissions are repetitions of the same transport block (TB).

Clause 67. The UE of any of clauses 62 to 66, wherein the first triggering event comprises an initial contention-based transmission of the first communication subject to listen before talk (LBT), and wherein a starting time for the second communication is offset from the initial contention-based transmission.

Clause 68. The UE of any of clauses 57 to 67, wherein the first communication comprises multiple repetitions of a physical downlink shared channel (PDSCH).

Clause 69. The UE of clause 68, wherein the first triggering event includes successful decoding of the PDSCH at the UE, and wherein the subset of resources for the second communication comprise a plurality of physical uplink control channel (PUCCH) candidate resources.

Clause 70. The UE of any of clauses 68 to 69, wherein the UE begins transmission of the second communication comprising PUCCH feedback on an earliest candidate resource following the successful decoding of the PDSCH, or wherein the UE begins communication of the second communication comprising a next downlink or uplink communication on a respective candidate resource based on a time offset following the successful decoding of the PDSCH.

Clause 71. The UE of any of clauses 68 to 70, wherein the UE begins transmission of the second communication comprising PUCCH feedback on an earliest candidate resource following the successful decoding of the PDSCH, and wherein the UE, based on a second conditional grant for a third communication, begins communication of the third communication comprising a next downlink or uplink communication on a resource based on a time offset following the successful decoding of the PDSCH.

Clause 72. The UE of any of clauses 57 to 71, wherein the first communication comprises multiple repetitions of a physical uplink shared channel (PUSCH).

Clause 73. The UE of clause 72, wherein the first triggering event includes successful decoding of the PUSCH at the wireless node, and wherein the subset of resources for the second communication comprise a plurality of physical downlink control channel (PDCCH) candidate resources.

Clause 74. The UE of clause 73, wherein the UE monitors for the second communication comprising PDCCH on the plurality of PDCCH candidate resources.

Clause 75. The UE of any of clauses 73 to 74, wherein the UE, based on a second conditional grant for a third communication, begins communication of the third communication comprising a next downlink or uplink communication on a resource based on a time offset following receipt of the PDCCH.

Clause 76. The UE of any of clauses 57 to 75, wherein the first communication corresponds to a downlink communication, an uplink communication, a sidelink communication, or a fronthaul communication.

Clause 77. The UE of any of clauses 57 to 76, wherein the second communication corresponds to a downlink communication, an uplink communication, a sidelink communication, or a fronthaul communication.

Clause 78. The UE of any of clauses 57 to 77, wherein the first conditional grant follows the grant.

Clause 79. The UE of any of clauses 57 to 78, wherein the grant follows the first conditional grant.

Clause 80. A wireless node, comprising: means for transmitting, to a user equipment (UE), a grant of a set of resources for a first communication between the UE and the wireless node; means for transmitting, to the UE, a first conditional grant associated with a set of conditional parameters for a second communication that overrides the grant for some or all of a subset of the set of resources; means for detecting a first triggering event or an indication of the first triggering event for triggering the first conditional grant with at least one conditional parameter of the set of conditional parameters; and means for performing the second communication in accordance with the at least one conditional parameter on some or all of the subset of resources based on the detection.

Clause 81. The wireless node of clause 80, wherein the first triggering event is based on one or more parameters with values that are not known when the first conditional grant is received.

Clause 82. The wireless node of clause 80, wherein the set of conditional parameters is unspecified in the first conditional grant, or wherein the set of conditional parameters comprises a list of candidate values for the set of conditional parameters in the first conditional grant, or wherein the set of conditional parameters comprises a range of candidate values for the set of conditional parameters in the first conditional grant, or a combination thereof.

Clause 83. The wireless node of clause 80, wherein the set of resources is associated with consecutive uplink transmissions in New Radio Unlicensed (NRU) spectrum.

Clause 84. The wireless node of clause 80, wherein the first communication comprises multiple repetitions of a physical downlink shared channel (PDSCH) or a physical uplink shared channel (PUSCH).

Clause 85. A non-transitory computer-readable medium storing computer-executable instructions that, when executed by a user equipment (UE), cause the UE to: receive, from a wireless node, a grant of a set of resources for a first communication between the UE and the wireless node; receive, from the wireless node, a first conditional grant associated with a set of conditional parameters for a second communication that overrides the grant for some or all of a subset of the set of resources; detect a first triggering event or an indication of the first triggering event for triggering the first conditional grant with at least one conditional parameter of the set of conditional parameters; and perform the second communication in accordance with the at least one conditional parameter on some or all of the subset of resources based on the detection.

Clause 86. The non-transitory computer-readable medium of clause 85, wherein the one or more instructions further cause the UE to: cancel, in response to the detection, the first communication on some or all of the subset of resources.

Clause 87. The non-transitory computer-readable medium of any of clauses 85 to 86, wherein the first triggering event is based on one or more parameters with values that are not known when the first conditional grant is received.

Clause 88. The non-transitory computer-readable medium of any of clauses 85 to 87, wherein the set of conditional parameters is unspecified in the first conditional grant, or wherein the set of conditional parameters comprises a list of candidate values for the set of conditional parameters in the first conditional grant, or wherein the set of conditional parameters comprises a range of candidate values for the set of conditional parameters in the first conditional grant, or a combination thereof.

Clause 89. The non-transitory computer-readable medium of any of clauses 85 to 88, wherein the first triggering event is indicated by the first conditional grant, or pre-configured by a higher-layer messaging, or pre-defined.

Clause 90. The non-transitory computer-readable medium of any of clauses 85 to 89, wherein the set of resources is associated with consecutive uplink transmissions in New Radio Unlicensed (NRU) spectrum.

Clause 91. The non-transitory computer-readable medium of clause 90, wherein the first triggering event comprises cancellation of the first communication on the subset of resources.

Clause 92. The non-transitory computer-readable medium of clause 91, wherein the one or more instructions further cause the UE to: wherein the first communication comprises multiple transmissions of a scheduled or configured physical uplink shared channel (PUSCH), wherein the first triggering event comprises a demodulation reference signal (DMRS) that indicates the cancellation of the scheduled or configured PUSCH on the subset of resources due to listen before talk (LBT) failure, and wherein the second communication comprises physical downlink shared channel (PDSCH).

Clause 93. The non-transitory computer-readable medium of any of clauses 90 to 92, wherein the first communication comprises multiple transmissions of a scheduled or configured physical uplink shared channel (PUSCH), and wherein the consecutive uplink transmissions are each associated with a different transport block (TB).

Clause 94. The non-transitory computer-readable medium of any of clauses 90 to 93, wherein the first communication comprises multiple repetitions of a scheduled or configured physical uplink shared channel (PUSCH) or physical uplink control channel (PUCCH), and wherein the consecutive uplink transmissions are repetitions of the same transport block (TB).

Clause 95. The non-transitory computer-readable medium of any of clauses 90 to 94, wherein the first triggering event comprises an initial contention-based transmission of the first communication subject to listen before talk (LBT), and wherein a starting time for the second communication is offset from the initial contention-based transmission.

Clause 96. The non-transitory computer-readable medium of any of clauses 85 to 95, wherein the first communication comprises multiple repetitions of a physical downlink shared channel (PDSCH).

Clause 97. The non-transitory computer-readable medium of clause 96, wherein the first triggering event includes successful decoding of the PDSCH at the UE, and wherein the subset of resources for the second communication comprise a plurality of physical uplink control channel (PUCCH) candidate resources.

Clause 98. The non-transitory computer-readable medium of any of clauses 96 to 97, wherein the UE begins transmission of the second communication comprising PUCCH feedback on an earliest candidate resource following the successful decoding of the PDSCH, or wherein the UE begins communication of the second communication comprising a next downlink or uplink communication on a respective candidate resource based on a time offset following the successful decoding of the PDSCH.

Clause 99. The non-transitory computer-readable medium of any of clauses 96 to 98, wherein the UE begins transmission of the second communication comprising PUCCH feedback on an earliest candidate resource following the successful decoding of the PDSCH, and wherein the UE, based on a second conditional grant for a third communication, begins communication of the third communication comprising a next downlink or uplink communication on a resource based on a time offset following the successful decoding of the PDSCH.

Clause 100. The non-transitory computer-readable medium of any of clauses 85 to 99, wherein the first communication comprises multiple repetitions of a physical uplink shared channel (PUSCH).

Clause 101. The non-transitory computer-readable medium of clause 100, wherein the first triggering event includes successful decoding of the PUSCH at the wireless node, and wherein the subset of resources for the second communication comprise a plurality of physical downlink control channel (PDCCH) candidate resources.

Clause 102. The non-transitory computer-readable medium of clause 101, wherein the UE monitors for the second communication comprising PDCCH on the plurality of PDCCH candidate resources.

Clause 103. The non-transitory computer-readable medium of any of clauses 101 to 102, wherein the UE, based on a second conditional grant for a third communication, begins communication of the third communication comprising a next downlink or uplink communication on a resource based on a time offset following receipt of the PDCCH.

Clause 104. The non-transitory computer-readable medium of any of clauses 85 to 103, wherein the first communication corresponds to a downlink communication, an uplink communication, a sidelink communication, or a fronthaul communication.

Clause 105. The non-transitory computer-readable medium of any of clauses 85 to 104, wherein the second communication corresponds to a downlink communication, an uplink communication, a sidelink communication, or a fronthaul communication.

Clause 106. The non-transitory computer-readable medium of any of clauses 85 to 105, wherein the first conditional grant follows the grant.

Clause 107. The non-transitory computer-readable medium of any of clauses 85 to 106, wherein the grant follows the first conditional grant.

Clause 108. A non-transitory computer-readable medium storing computer-executable instructions that, when executed by a wireless node, cause the wireless node to: transmit, to a user equipment (UE), a grant of a set of resources for a first communication between the UE and the wireless node; transmit, to the UE, a first conditional grant associated with a set of conditional parameters for a second communication that overrides the grant for some or all of a subset of the set of resources; detect a first triggering event or an indication of the first triggering event for triggering the first conditional grant with at least one conditional parameter of the set of conditional parameters; and perform the second communication in accordance with the at least one conditional parameter on some or all of the subset of resources based on the detection.

Clause 109. The non-transitory computer-readable medium of clause 108, wherein the first triggering event is based on one or more parameters with values that are not known when the first conditional grant is received.

Clause 110. The non-transitory computer-readable medium of any of clauses 108 to 109, wherein the set of conditional parameters is unspecified in the first conditional grant, or wherein the set of conditional parameters comprises a list of candidate values for the set of conditional parameters in the first conditional grant, or wherein the set of conditional parameters comprises a range of candidate values for the set of conditional parameters in the first conditional grant, or a combination thereof.

Clause 111. The non-transitory computer-readable medium of any of clauses 108 to 110, wherein the set of resources is associated with consecutive uplink transmissions in New Radio Unlicensed (NRU) spectrum.

Clause 112. The non-transitory computer-readable medium of any of clauses 108 to 111, wherein the first communication comprises multiple repetitions of a physical downlink shared channel (PDSCH) or a physical uplink shared channel (PUSCH).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE), comprising:
    receiving, from a wireless node, a grant of a set of resources for a first communication between the UE and the wireless node;
    receiving, from the wireless node, a first conditional grant associated with a set of conditional parameters for a second communication that overrides the grant for some or all of a subset of the set of resources;
    detecting a first triggering event or an indication of the first triggering event for triggering the first conditional grant with at least one conditional parameter of the set of conditional parameters; and
    performing the second communication in accordance with the at least one conditional parameter on some or all of the subset of resources based on the detection,
    wherein the first communication comprises multiple repetitions of a physical downlink shared channel (PDSCH),
    wherein the first triggering event includes successful decoding of the PDSCH at the UE, and
    wherein the subset of resources for the second communication comprise a plurality of physical uplink control channel (PUCCH) candidate resources.

2. The method of claim 1, further comprising:
    canceling, in response to the detection, the first communication on some or all of the subset of resources.

3. The method of claim 1, wherein the first triggering event is based on one or more parameters with values that are not known when the first conditional grant is received.

4. The method of claim 1,
    wherein the set of conditional parameters is unspecified in the first conditional grant, or
    wherein the set of conditional parameters comprises a list of candidate values for the set of conditional parameters in the first conditional grant, or
    wherein the set of conditional parameters comprises a range of candidate values for the set of conditional parameters in the first conditional grant, or
    a combination thereof.

5. The method of claim 1, wherein the first triggering event is indicated by the first conditional grant, or preconfigured by a higher-layer messaging, or pre-defined.

6. The method of claim 1,
    wherein the UE begins transmission of the second communication comprising PUCCH feedback on an earliest candidate resource following the successful decoding of the PDSCH, or
    wherein the UE begins communication of the second communication comprising a next downlink or uplink communication on a respective candidate resource based on a time offset following the successful decoding of the PDSCH.

7. The method of claim 1,
wherein the UE begins transmission of the second communication comprising PUCCH feedback on an earliest candidate resource following the successful decoding of the PDSCH, and
wherein the UE, based on a second conditional grant for a third communication, begins communication of the third communication comprising a next downlink or uplink communication on a resource based on a time offset following the successful decoding of the PDSCH.

8. The method of claim 1, wherein the first conditional grant follows the grant.

9. The method of claim 1, wherein the grant follows the first conditional grant.

10. A method of operating a wireless node, comprising:
transmitting, to a user equipment (UE), a grant of a set of resources for a first communication between the UE and the wireless node;
transmitting, to the UE, a first conditional grant associated with a set of conditional parameters for a second communication that overrides the grant for some or all of a subset of the set of resources;
detecting a first triggering event or an indication of the first triggering event for triggering the first conditional grant with at least one conditional parameter of the set of conditional parameters; and
performing the second communication in accordance with the at least one conditional parameter on some or all of the subset of resources based on the detection,
wherein the first communication comprises multiple repetitions of a physical downlink shared channel (PDSCH),
wherein the first triggering event includes successful decoding of the PDSCH at the UE, and
wherein the subset of resources for the second communication comprise a plurality of physical uplink control channel (PUCCH) candidate resources.

11. The method of claim 10, wherein the first triggering event is based on one or more parameters with values that are not known when the first conditional grant is received.

12. The method of claim 10,
wherein the set of conditional parameters is unspecified in the first conditional grant, or
wherein the set of conditional parameters comprises a list of candidate values for the set of conditional parameters in the first conditional grant, or
wherein the set of conditional parameters comprises a range of candidate values for the set of conditional parameters in the first conditional grant, or
a combination thereof.

13. A user equipment (UE), comprising:
a memory;
at least one transceiver; and
at least one processor communicatively coupled to the memory and the at least one transceiver, the at least one processor configured to:
receive, via the at least one transceiver, from a wireless node, a grant of a set of resources for a first communication between the UE and the wireless node;
receive, via the at least one transceiver, from the wireless node, a conditional grant associated with a set of conditional parameters for a second communication that overrides the grant for some or all of a subset of the set of resources;
detect a triggering event or an indication of the triggering event for triggering the conditional grant with at least one conditional parameter of the set of conditional parameters; and
perform the second communication in accordance with the at least one conditional parameter on some or all of the subset of resources based on the detection,
wherein the first communication comprises multiple repetitions of a physical downlink shared channel (PDSCH),
wherein the first triggering event includes successful decoding of the PDSCH at the UE, and
wherein the subset of resources for the second communication comprise a plurality of physical uplink control channel (PUCCH) candidate resources.

14. A wireless node, comprising:
a memory;
at least one transceiver; and
at least one processor communicatively coupled to the memory and the at least one transceiver, the at least one processor configured to:
transmit, via the at least one transceiver, to a user equipment (UE), a grant of a set of resources for a first communication between the UE and the wireless node;
transmit, via the at least one transceiver, to the UE, a conditional grant associated with a set of conditional parameters for a second communication that overrides the grant for some or all of a subset of the set of resources;
detect a triggering event or an indication of the triggering event for triggering the conditional grant with at least one conditional parameter of the set of conditional parameters; and
perform the second communication in accordance with the at least one conditional parameter on some or all of the subset of resources based on the detection,
wherein the first communication comprises multiple repetitions of a physical downlink shared channel (PDSCH),
wherein the first triggering event includes successful decoding of the PDSCH at the UE, and
wherein the subset of resources for the second communication comprise a plurality of physical uplink control channel (PUCCH) candidate resources.

* * * * *